(12) United States Patent
Niell et al.

(10) Patent No.: US 12,124,619 B2
(45) Date of Patent: Oct. 22, 2024

(54) VM ENCRYPTION OF BLOCK STORAGE WITH END-TO-END DATA INTEGRITY PROTECTION IN A SMARTNIC

(71) Applicant: Intel Corporation, Santa Clara, CA (US)

(72) Inventors: Jose Niell, Franklin, MA (US); Kiel Boyle, Coquitlam (CA); Bradley Burres, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 17/133,469

(22) Filed: Dec. 23, 2020

(65) Prior Publication Data

US 2021/0150074 A1 May 20, 2021

(51) Int. Cl.
G06F 21/78 (2013.01)
G06F 21/60 (2013.01)
G06F 21/85 (2013.01)

(52) U.S. Cl.
CPC ............ G06F 21/78 (2013.01); G06F 21/602 (2013.01); G06F 21/85 (2013.01)

(58) Field of Classification Search
None
See application file for complete search history.

(56) References Cited

U.S. PATENT DOCUMENTS

2010/0131669 A1* 5/2010 Srinivas .................. G06F 9/452 709/233
2011/0029847 A1 2/2011 Goldenberg et al.
2013/0198585 A1 8/2013 Braam et al.
2016/0330283 A1 11/2016 Qian
2017/0220494 A1 8/2017 Shacham et al.
(Continued)

FOREIGN PATENT DOCUMENTS

EP          2216955 A1 *  8/2010  ............. H04L 67/14
WO  WO-2011048366 A1 *  4/2011  ............. G06F 21/56
WO       2020149772 A1     7/2020

OTHER PUBLICATIONS

International Search Report and Written Opinion for PCT Patent Application No. PCT/US21/52056, Mailed Jan. 18, 2022, 11 pages.
(Continued)

Primary Examiner — Benjamin E Lanier
(74) Attorney, Agent, or Firm — Compass IP Law PC

(57) ABSTRACT

Methods and apparatus for Virtual Machine (VM) encryption of block storage with end-to-end data integrity protection in a SmartNIC. For a Write operation, the NIC is configured to encrypt a data block, append the encrypted data block with protection information (PI) generated using data in the data block to generate a protected data block and forward the protected data block onto a network or fabric to be delivered to a storage node. For a Read operation, the NIC is configured to receive a protected data block comprising cipher text including encrypted payload data concatenated with an encrypted inner PI and an outer PI, use the inner and outer PIs to perform PI checks, decrypt the cipher text to extract payload data, and forward or write at least the payload to a host. The inner and outer PIs and data formats are compliant with an NVMe specification.

18 Claims, 18 Drawing Sheets

(56) References Cited

U.S. PATENT DOCUMENTS

| | | | |
|---|---|---|---|
| 2018/0024738 A1* | 1/2018 | Ngu | G06F 3/064 |
| | | | 711/103 |
| 2020/0366715 A1 | 11/2020 | Chopra et al. | |
| 2021/0150074 A1 | 5/2021 | Niell et al. | |
| 2021/0367777 A1* | 11/2021 | Benisty | G06F 21/85 |

OTHER PUBLICATIONS

Extended European Search Report for Patent Application No. 21911813.0, Mailed Jun. 4, 2024, 10 pages.

* cited by examiner

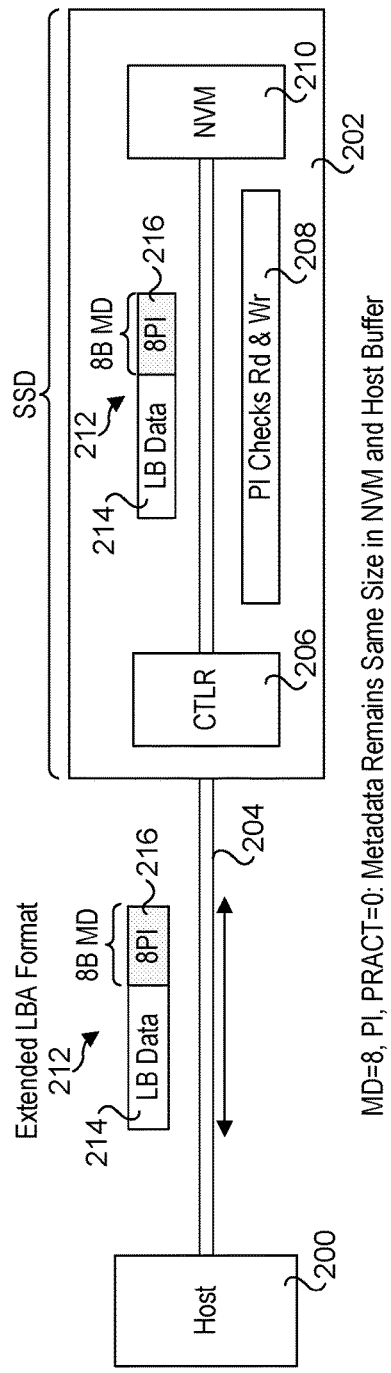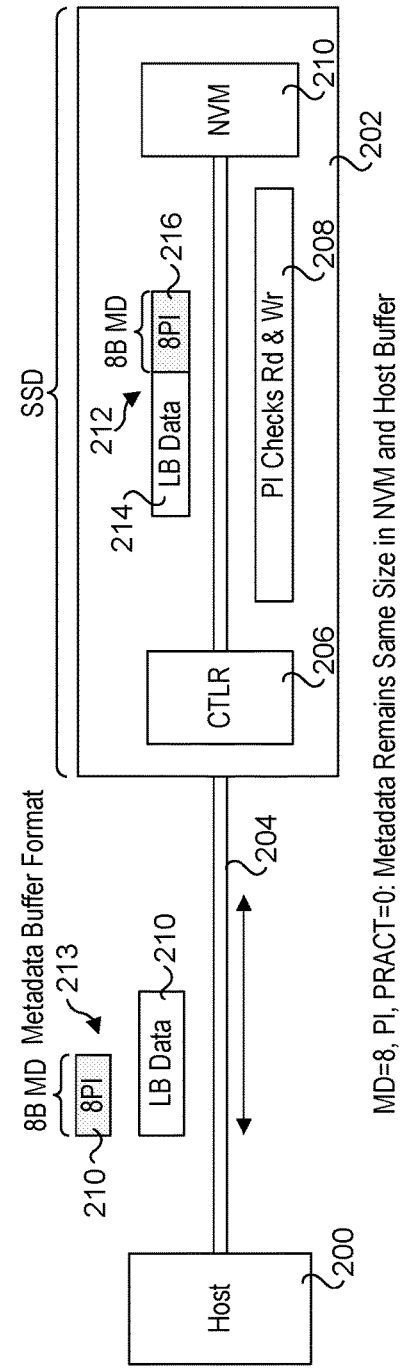

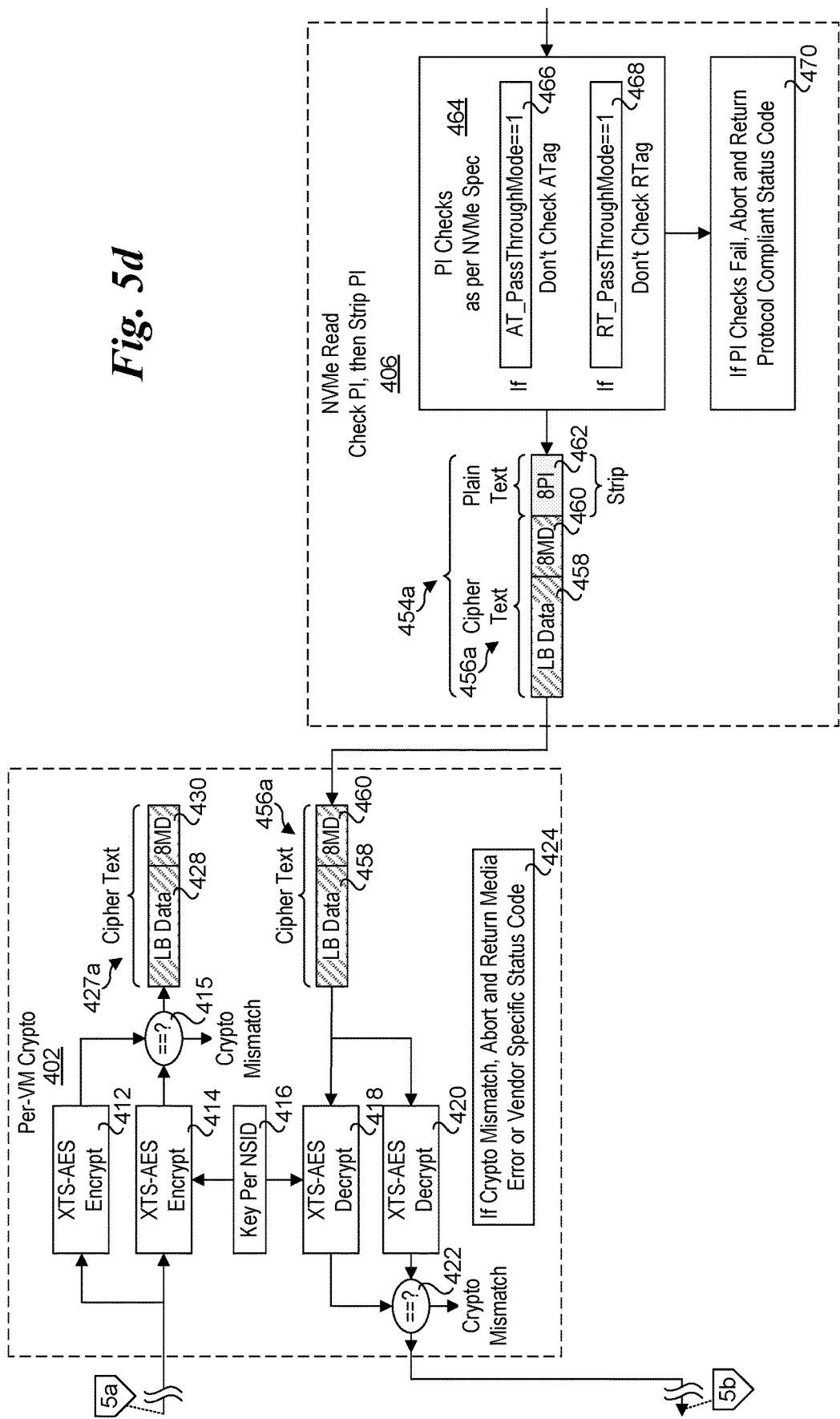

VM ENCRYPTION OF BLOCK STORAGE WITH END-TO-END DATA INTEGRITY PROTECTION IN A SMARTNIC

BACKGROUND INFORMATION

In state-of-the-art data centers, storage is disaggregated from compute nodes. For example, under some disaggregated architectures, storage resources, such as storage devices (e.g., Solid-State Drives, aka SSDs) and Storage Class Memory (SCM) are "pooled" in drawers or chassis that are communicatively coupled to compute nodes (e.g., servers, blade servers, server modules, etc.) via a fabric or network(s). In multi-tenant environments, multiple tenants may share physical resources provided by compute nodes through Virtual Machines (VMs), and the storage resources may likewise be shared.

Some advanced data centers employ block storage schemes that are abstracted such that applications running on VMs do not specify or need to know what physical storage resources are being used. For example, logical block addresses (LBA) may be used to store data on a remote storage node, where the mappings between the logical block addresses and physical storage locations on storage devices are abstracted from the applications running on VMs.

Due to security considerations, data protection schemes are needed to ensure that that each tenant's data cannot be accessed by other tenants. This is a challenge for disaggregated architectures, since both the compute and storage resources are shared. For example, cloud service providers (CSPs) provide Infrastructure as a Service (IaaS) and Platform as a Service (PaaS) services under which virtual compute resources are composed from physical hardware with the result being software from multiple tenants often running on the same physical machine(s). Meanwhile, a given storage node may store data for many tenants.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2a is a schematic diagram illustrating a first end-to-end data protection scheme for data transferred between a host and a locally connected SSD according to the NVMe specification using an extended LBA format;

FIG. 2b is a schematic diagram illustrating a second end-to-end data protection scheme for data transferred between a host and a locally connected SSD according to the NVMe specification using a metadata buffer format;

FIGS. 4a, 4b, 4c, 4d, and 4e collectively comprises a schematic diagram illustrating operations and logic implemented on the NIC to facilitate the end-to-end data protection scheme of FIG. 3, wherein FIG. 4a shows details of an inner PI block and a per-VM crypto block, FIG. 4b shows details of the per-VM crypto block and an NVMe Write append PI block, FIG. 4c shows an alternative configuration of the NVMe Write append PI block using alternate ATag and Rtag passthrough modes, FIG. 4d shows details of the per-VM crypto block and an NVMe Read block, and FIG. 5d shows an alternative configuration of the NVMe Read block using alternate ATag and Rtag passthrough modes;

FIGS. 5a, 5b, 5c, and 5d collectively comprises a schematic diagram illustrating operations and logic implemented on the NIC to facilitate the end-to-end data protection scheme for LB data stored on the host, wherein FIG. 5a shows details of an NVMe Write append inner PI block and a per-VM crypto block, FIG. 5b shows details of an NVMe Read check PI block and the per-VM crypto block; FIG. 5c shows details of the per-VM crypto block and an NVMe Write append PI block; and FIG. 5d shows details of the per-VM crypto block and an NVMe Read block;

FIG. 6b is a schematic diagram illustrating logic implemented in the NIC to implement the enhanced end-to-end data protection scheme of FIG. 6a;

DETAILED DESCRIPTION

Figure 1:
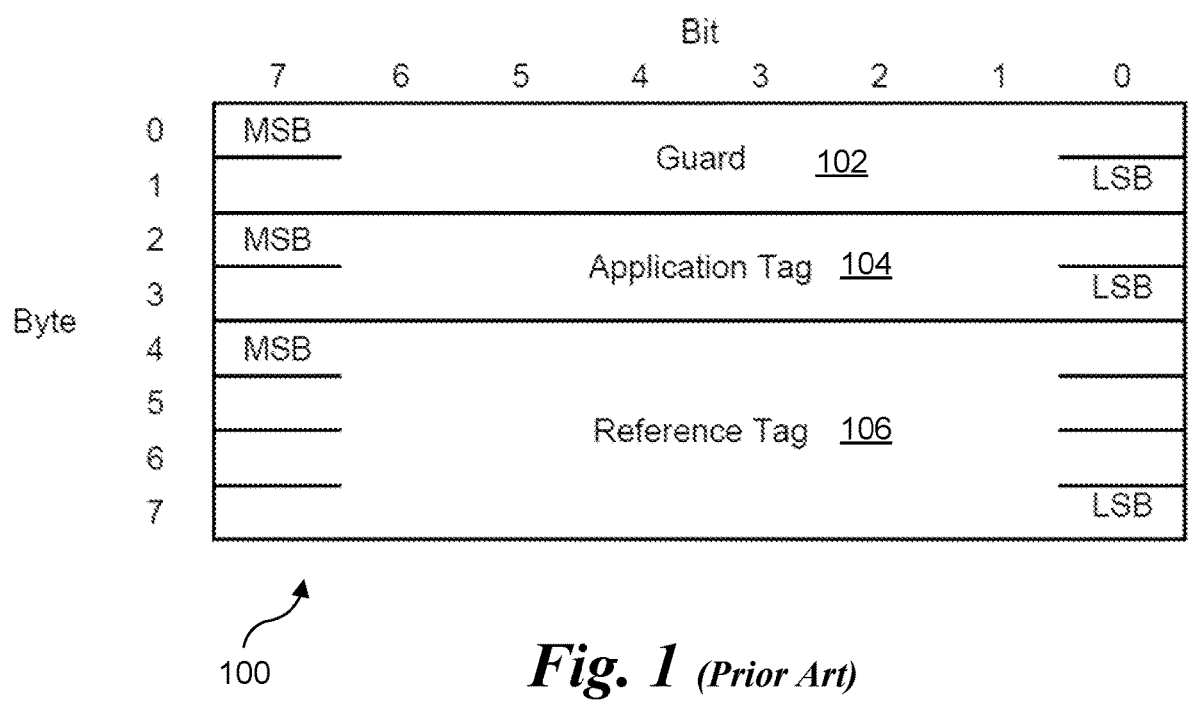
FIG. 1 is a diagram illustrating the format of protection information (PI) according to an NVMe specification.

Embodiments of methods and apparatus for VM encryption of block storage with end-to-end data integrity protection in a SmartNIC are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

NVM Express™ Revision 1.4 section 8.3 specifies optional end-to-end data protection that may be used for data transferred in accordance with NVMe protocols. Such end-to-end data protection may be used to provide robust data protection from an application on a host and running in a VM to the NVM (Non-volatile memory) media and back to the application itself. When enabled, additional protection information (e.g., CRC (Cyclic Redundancy Check)) is added to the logical block (LB) that may be evaluated by the controller and/or host software to determine the integrity of the logical block. This additional protection information may comprise either the first eight bytes of metadata or the last eight bytes of metadata, based on the format of the namespace. For metadata formats with more than eight bytes, if the protection information is contained within the first eight bytes of metadata, then the CRC does not cover any metadata bytes. For metadata formats with more than eight bytes, if the protection information is contained within the last eight bytes of metadata, then the CRC covers all metadata bytes up to but excluding these last eight bytes. Metadata and hence this protection information may be contiguous with the logical block data or stored in a separate buffer.

The Protection Information format 100 is shown in FIG. 1 and is contained in the metadata associated with each logical block. The Guard field 102 contains a CRC-16 computed over the logical block data. The Application Tag 104 is an opaque data field not interpreted by the controller that may be used to disable checking of protection information. The Reference Tag 106 associates logical block data with an address and protects against misdirected or out-of-order logical block transfer. Like Applicant Tag 104, Reference Tag 106 may also be used to disable checking of protection information.

The protection information processing performed as a side effect of Read and Write commands is controlled by the Protection Information Action (PRACT) bit in the command. If the namespace is not formatted with end-to-end data protection, the logical block data and metadata is transferred from the host to the NVM with no protection information related processing by the controller. If the namespace is formatted with protection information and the PRACT bit is cleared to '0', then logical block data and metadata, which contains the protection information and may contain additional metadata, are transferred from the host buffer to NVM (i.e., the metadata field remains the same size in the NVM and the host buffer). As the logical block data and metadata passes through the controller, the protection information is checked. If a protection information check error is detected, the command completes with the status code of the error detected (e.g., End-to-end Guard Check Error, End-to-end Application Tag Check Error, or End-to-end Reference Tag Check Error).

If the namespace is formatted with protection information and the PRACT bit is set to '1', then:

1. If the namespace is formatted with Metadata Size equal to 8, then the logical block data is transferred from the host buffer to the controller. As the logical block data passes through the controller, the controller generates and appends protection information to the end of the logical block data, and the logical block data and protection information are written to NVM (i.e., the metadata is not resident within the host buffer); and
2. If the namespace is formatted with Metadata Size greater than 8, then the logical block data and the metadata are transferred from the host buffer to the controller. As the metadata passes through the controller, the controller overwrites the protection information portion of the metadata. The logical block data and metadata are written to the NVM (i.e., the metadata field remains the same size in the NVM and the host buffer). The location of the protection information within the metadata s configured when the namespace is formatted.

Figure 2C:
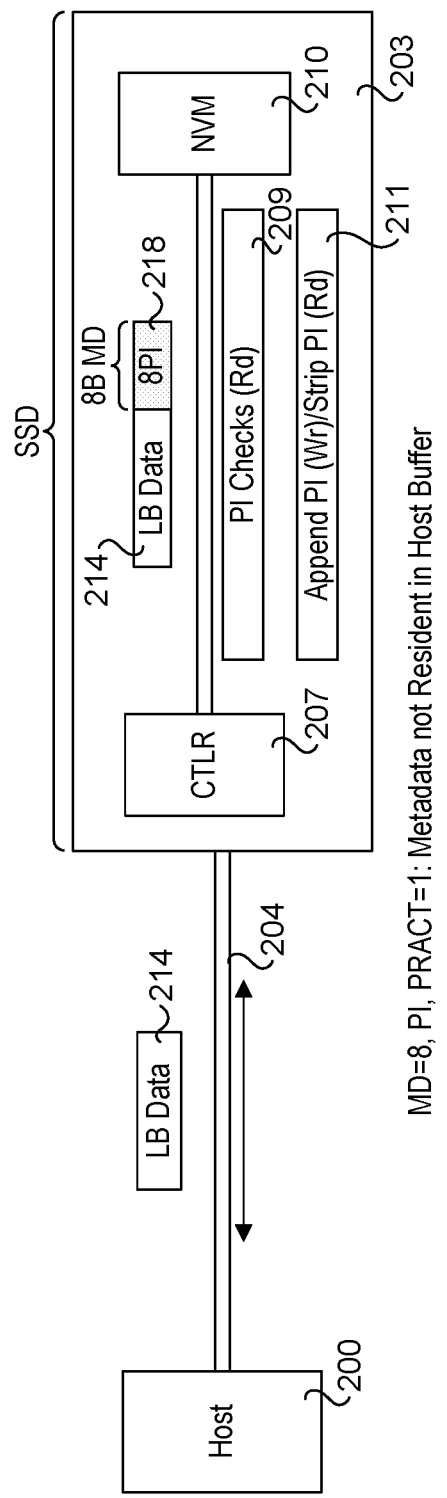
FIG. 2c is a schematic diagram illustrating a first end-to-end data protection scheme for data transferred between a host and a locally connected SSD according to the NVMe specification using LB data without metadata resident in the host buffer.

Generally, the end-to-end data protection schemes may employ various configurations. Three example configurations are shown in FIGS. 2a, 2b, and 2c. In each of these figures, a host 200 communicates with an SSD 202 over a link 204. In each of these examples, the SSD is considered a local storage resource that is not accessed over a network or fabric. For the schemes shown in FIGS. 2a and 2b, each SSD 202 includes a controller 206, protection information (PI) check Read (Rd) and Write (Wr) logic 208, and non-volatile memory (NVM) 210.

Under the first scheme shown in FIG. 2a, an extended Logical Block Address (LBA) format 212 is used, including logical block data 214 to which 8 Bytes (B) of PI are appended comprising metadata (MD) 116. Under this scheme, the 8B of PI metadata 216 remains the same size in the host buffer in host 200 and NVM 210. Controller 206 passes through Read and Write data it receives in its received form (LB data 214 appended with 8B metadata 216). The PRACT bit is cleared (='0').

The second scheme shown in FIG. 2b is similar to that of FIG. 2a, except a Metadata buffer format 213 is used in place of extended LBA format 212 at host 200 that includes logical block data 214 and an 8B PI MD 216. As with the FIG. 2a scheme, 8B PI metadata 214 remains the same size in NVM 210 and the host buffer. Controller 206 passes through Read and Write data it receives in its received form (LB data 214 appended with 8B PI metadata 216 having extended LBA format 212). The PRACT bit is cleared (='0').

The third scheme shown in FIG. 2c illustrates a use case where the PRACT bit is set (='1'). As shown, host 200 is coupled to an SSD 203 via a link 204. SSD 203 includes a controller 207 configured to implement PI Checks (Rd) logic 209 for Reads and Append PI (WR)/Strip PI (Rd) logic 211. FIG. 1c further shows LB data 214 being sent over link 204 8B PI MD 218 appended to LB data 214 being transferred between controller 207 and NVM 210. As discussed for condition 1. above, for 8B (or less) of metadata the metadata is appended to the LB Data by the controller; this is performed by the Append PI (WR) portion of Append PI (WR)/Strip PI (Rd) logic 211. For reads, 8B PI MD 218 is stripped by the Strip PI (Rd) portion of Append PI (WR)/Strip PI (Rd) logic 211, leaving LB data 214, which is then returned to host 200. Thus, under this configuration the metadata is resident in NVM 210 but is not resident on host 200.

One potential solution for end-to-end data protection for data transfers between hosts and remote storage nodes is to employ direct implementation of VM encryption/decryption on a compute node using a SmartNIC. Notably, the end-to-end protection information must be encrypted prior to transporting on the fabric to the storage node. This is because the PI includes a CRC of the payload. Keeping the CRC in cleartext (i.e., unencrypted) is a critical vulnerability and would not meet the XTS-AES encryption standards. XTX employs an XEX-based tweaked-codebook mode with ciphertext stealing (hence XTS). AES is Advance Encryption Standard. Because the PI, including the CRC, is encrypted, the end-to-end protection checks at the target SSD must be disabled. Otherwise, the end-to-end check will always fail. In summary, this basic solution provides VM encryption, but prevents the usage of end-to-end data integrity protection.

In accordance with embodiments of solutions disclosed herein, both VM encryption and end-to-end data integrity protection are enabled by having the SmartNIC append an "outer" Protection Integrity field to each data block. This "outer" Protection Information does not need to be encrypted because its CRC is computed after the payload and original metadata is encrypted. The format of the final metadata has the protection information in the "last" bytes of the metadata and is compliant with the NVMe protocol.

Figure 3:
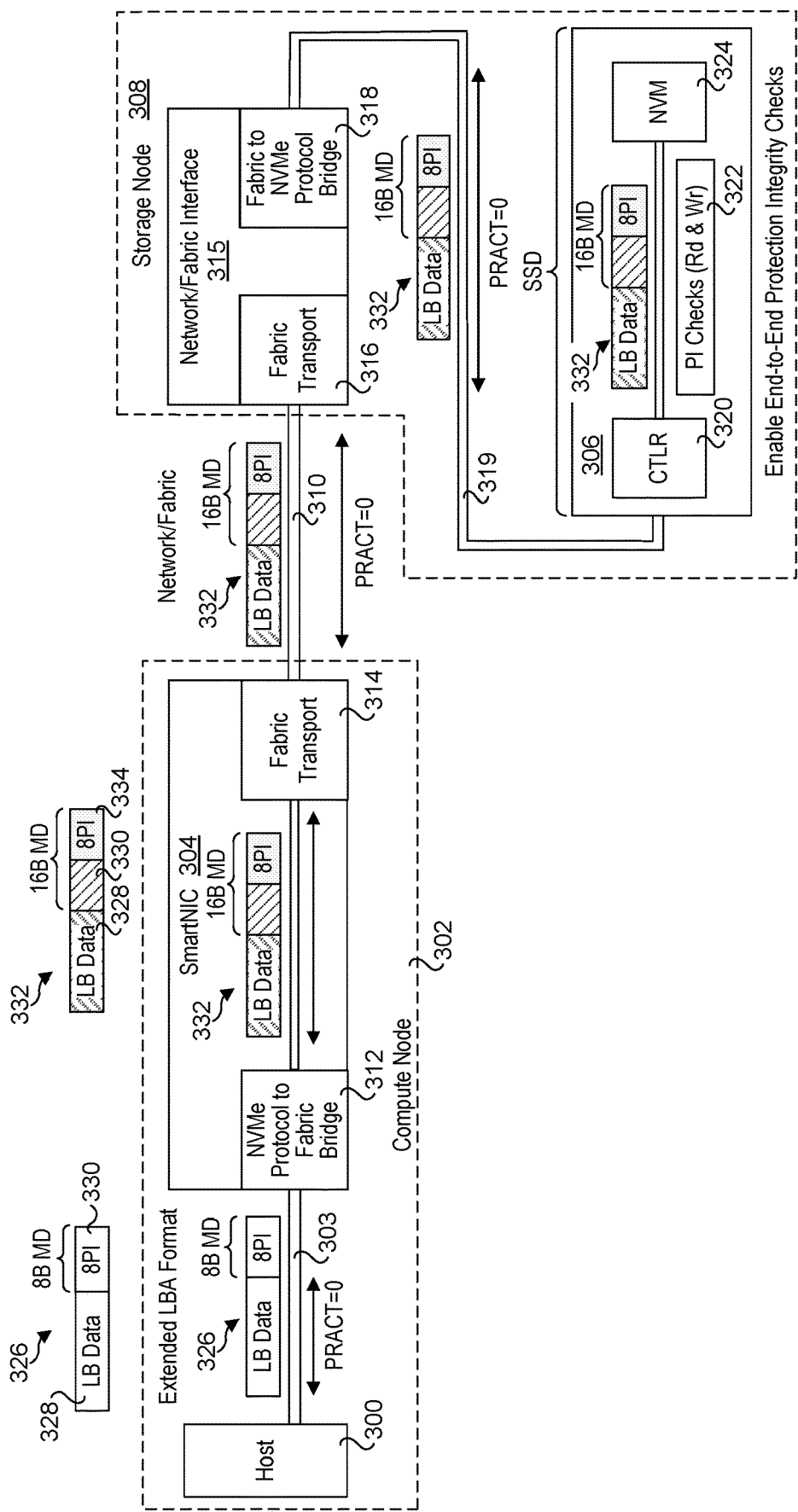
FIG. 3 is a schematic diagram illustrating an end-to-end data protection scheme for data transferred between a host including a NIC and a storage node coupled to the NIC via a network or fabric, wherein data is stored on the host using an extended LBA format.

An abstracted depiction of one embodiment of this approach is shown in FIG. 3. In this example, the end-to-end transfer is between a host 300 on a compute node 302 including or coupled to a SmartNIC 304 and an SSD 306 in a storage node 308 over a network/fabric 310. Host 300 is connected to SmartNIC 304 via an interconnect 303 such as a Peripheral Component Interconnect Express (PCIe) link in some embodiments. Other Input/Output (I/O) links may also be used in other embodiments. SmartNIC 304 includes an NVMe protocol to fabric bridge 312 and a fabric transport block 314. Storage node 308 includes a network/fabric interface 315 including a fabric transport block 316 and a fabric to NVMe protocol bridge 318 that is connected via a link 319 to SSD 306. SSD 306 includes a controller 320, PI checks logic 322, and NVM 324.

Bi-directional arrows are shows to represent data conversion processes implemented for Writes (to the right) and Reads (to the left). First a Write will be described, followed by a Read.

In this example, data blocks are stored in host 300 using the extended LBA format 212 described above, as depicted by a data block 326 including LB data 328 to which an "inner" 8B PI 330 is appended, wherein the inner 8B PI comprises 8B of metadata. For a Write, data block 326 is transferred over interconnect 303 from host 300 to SmartNIC 304 with PRACT=0, where it forwarded to NVMe protocol to fabric bridge 312. For example, in one embodiment where interconnect 303 is PCIe, data block 326 is transferred for a buffer on host 300 to a buffer on SmartNIC 304 using a DMA (Direct Memory Access) transaction and using an associated NVMe protocol.

As described and illustrated in detail below, for Writes NVMe protocol to fabric bridge 312 is configured to encrypt data blocks and append an "outer" Protection Integrity field for each data block. After encryption of the payload+"inner" PI is completed, a new CRC is computed across the full encrypted cipher text. This new "outer" PI is inserted after the "inner" PI. The SmartNIC transforms the Drive format from Payload+N bytes of Metadata→Payload+N*2 bytes of Metadata. The Payload and "inner" PI are encrypted, while the "outer" PI is cleartext. The Metadata is essentially 50% cypher text and 50% cleartext. The cypher text portion is treated as "User Metadata," while the cleartext portion is valid protection information that can be used by the storage target SSD.

The foregoing is depicted as a protected data block 332, which includes LB data 328 and inner 8B PI 330 in encrypted form appended with an 8B PI 334. The combination of the encrypted 8B PI 330 and 8B PI 334 comprise 16B of metadata. While the original content of data block 328 is encrypted, 8B PI 330 is in cleartext.

Internally within SmartNIC 304, protected data block 332 is transferred from NVMe protocol to fabric bridge 312 to fabric transport block 314, which includes applicable circuitry to prepare protected data block 332 for transport over network/fabric 310. For example, when network/fabric 310 is Ethernet, fabric transport block 314 includes MAC (Media Access Channel) and PHY (Physical Layer) circuitry to transmit protected data block 332 of the Ethernet network. More generally, network/fabric 310 may be any one of various types of networks and/or fabrics employing wired and optical links and employing standardized or proprietary protocols. To facilitate transmit and receive operations the fabric transport blocks illustrated and described herein include one or more transmit ports and one or more receive ports, where a transmit/receive port pair may be referred to as a network port or fabric port. In some embodiments, the NVMe-oF (NVMe over Fabrics) protocol is used to transmit data over network/fabric 310.

Next, protected data block 332 is transmitted from a transmit port of fabric transport block 314 over one or more links in network/fabric 310 to be received at a receive port in fabric transport block 316 of storage node 308 with PRACT=0. Internally within network/fabric interface 315, protected data block 332 is transferred from transport block 316 to fabric to NVMe protocol bridge 318 which is configured to provide a bridging function between the fabric protocol and an NVMe protocol. This bridging function operations at (a) different layer(s) that is/are independent of the data such that the format of protected data block 332 remains the same as it is forwarded from fabric to NVMe protocol bridge 318 to SSD 306 over link 319 with PRACT=0. Protected data block 332 is processed by controller 320 to perform PI checks 322 for Write operations, and when the PI checks are passed Protected data block 332 is written in the same format to NVM 324.

The operations and format conversions for a Read are the inverse of those used for a Write, with the operations flowing from right-to-left, beginning with the data to be read being stored in NVM 324 as protected data block 332. As illustrated, this data is kept in this protected format until it reaches NVMe protocol to fabric bridge 312 in SmartNIC 304. At this point 8B PI 334 is stripped off and the encrypted portion of protected data block 332 is decrypted to extract the original LB data 326 and original inner 8B PI 330.

Further details of the logic implemented in NVMe protocol to fabric bridge 312 to perform associated functionality are shown in FIGS. 4a-4e. In these Figures, storage node 308 is depicted as separate from SSD 306, which is a configuration that may be used in some embodiments. As discussed above SSD 306 may also be part of a storage node. Generally, in the embodiments herein, the SSDs are illustrative of various types of NVM devices. For example, in some embodiments SSDs may be replaced with SCM devices, such as NVDIMMs (non-volatile dual in-line memory modules) and the like.

Figure 4A:
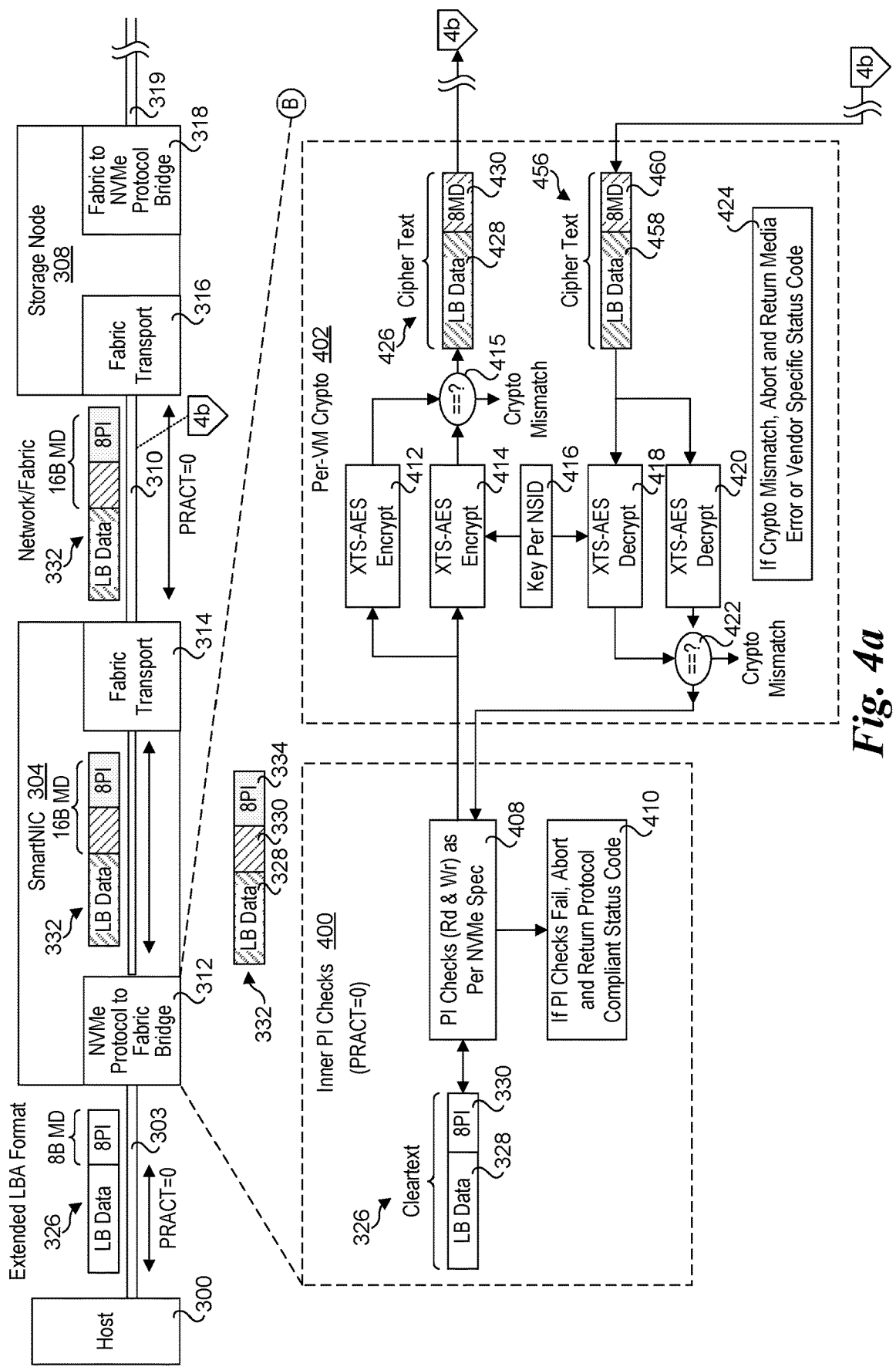
Figure 4B:
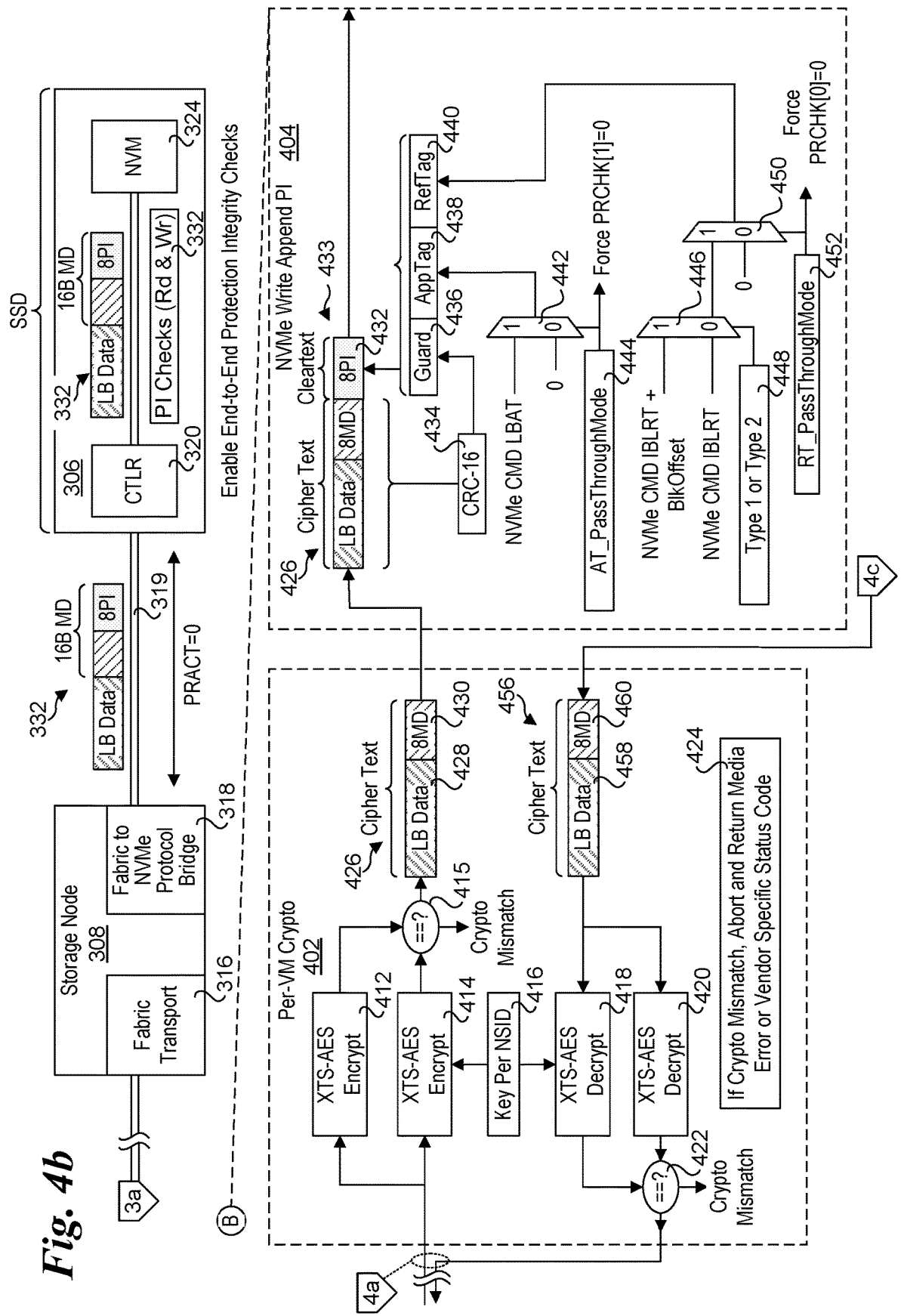

The top level logic blocks include an inner PI checks block 400 (FIG. 4a), a per-VM crypto block 402 (FIGS. 4a-b, 4d-e), an NVMe Write append PI block 404 (FIG. 4b)

and a an NVMe Read block 406. Inner PI checks block 400 includes a block 408 in which Read and Write PI checks are performed per the NVMe specification(s). If a PI check fails, the process is aborted and a protocol compliant status code is returned, as depicted in a block 410. As further shown, the PI checks are performed using the cleartext form of 8B PI 330.

Per-VM crypto block 402 is configured to perform cryptographic operations (encryption and decryption) on a per-VM basis or a more granular per VM/Namespace combination. In the illustrated embodiments, XTS-AES encryption/decryption is used. This is a block cipher-based mode encryption scheme that also referred to as AES-XTS and is standardized in IEEE Std 1619-2007. In the illustrated embodiments, parallel encryption/decryption engines are used. After completing applicable checks, the entire Host provided payload+metadata (i.e. "inner" PI) is run through a pair of crypto engines in parallel. As data is encrypted (or decrypted), there is a very small chance that a data integrity could occur, yet there is no CRC check protecting this logic. To address this, per-VM crypt block 402 employs two XTS-AES encryption engines 412 and 414 in parallel and two XTS-AES decrypt engines 418 and 420 in parallel. The output of the parallel engines are compared, as depicted by comparators 415 and 422. If the outputs do not match, as depicted by "Crypto Mismatch," then the command is handled as either a Media Error of Vendor Specific Error (the final decision is commonly done by Firmware), as shown in a block 424.

In one embodiment, each of XTS-AES encryption engines 412 and 414 and XTS-AES decrypt engines 418 and 420 employ a per VM key that is provided by or otherwise associated with a unique VM. Another enhancement from the direct implementation is to provide one key per NSID (Namespace ID) instead of one key per VM, as depicted by a per NSID key 416. This provides flexibility for VMs to be assigned more than one Namespace while maintaining XTS-AES tweak requirements. Mainly, XTS-AES requires each block address to have a unique tweak. Considering that SSDs generally use Logical Block Address as the tweak value and that each NSID defines its own scope for Logical Block Addresses.

As illustrated in FIG. 4a, the cleartext form of data block 326 output from block 408 is input in parallel to XTS-AES encryption engines 412 and 414, each of which output cipher text 426 comprising encrypted LB data 428 and encrypted metadata 430. Padding may be added to LB data 328 if applicable. When the cipher text output of XTS-AES encryption engines 412 and 414 match, cipher text 426 is forwarded to NVMe Write append PI block 404 shown in FIG. 4b.

As illustrated in FIG. 4b, an 8B PI 432 is computed and appended to cipher text 426 to form protected data block 433 having the same format as protected data block 332. 8B PI 432 has the standard Protection Information format 100 shown in FIG. 1 and discussed above, which includes a Guard field 436, an Application Tag (AppTag) 438 and a Reference Tag (RefTag 440). The Guard field 102 contains a CRC-16 computed over the logical block data. Guard field 436 contains a CRC-16 calculated over logical block data comprising cipher text 426.

AT_PassThrough

As discussed above, AppTag 438 is an opaque data field not interpreted by the controller that may be used to disable checking of protection information. AppTag 438 is generated by the Host Software. There is a risk that this also has sensitive info that may not be in cleartext. To address this, an AT_PassThrough mode may be set to enabled or disabled.

A datacenter administrator may choose to warn their customers that Application Tags are in the clear. If so, they can enable AT_PassThrough mode which inserts the original Application Tag on the "outer" PI. Optionally, a datacenter administrator may choose to safeguard their customers by forcing the Application Tag in the "outer" PI to all 0s. This is done by disabling AT_PassThrough mode. When AT_PassThrough Mode is disabled, the NVMe command PRCHK[1] is also forced to 0 to ensure that the Application Tag is not checked at the target SSD. In some embodiments, the AT_PassThrough mode could be made to be configurable per NSID or per VM.

Optionally, a PRCHK1_PassThrough mode may be implemented. The mode supports independent control of the checks even if the ATag is passed through. For example, a data center operator might want to make the original ATag visible in clear text to the storage target but not checked by the SSD.

As depicted by a multiplexer 442, AppTag 438 is based on logic applied to an NVMe Command Local Block Application Tag (LBAT) input and an Application Tag passthrough mode (AT_PassThroughMode) 444 of enabled (i.e., '1') or disabled (i.e., '0').

RT_PassThrough

The Reference Tag (Reffag 440) is generated by the Host Software to add Block Address Integrity checks. The NVMe protocol supports 3 Types of Reference Tag checks.

In certain disaggregated storage use models, the Logical Block Address of the original NVMe command is preserved all the way to the storage target. In this case, the Reference Tag can be passed through and can be properly checked at the Storage target. In these cases, the data center administrator would enable Reference Tag Pass Through (RT_PassThrough is set, i.e., ='1'). The SmartNIC will provide the block's corresponding Reference Tag as per the NVMe specification.

In certain disaggregated storage use models, the Logical Block Address of the original NVMe command is modified one or more times before reaching the storage target SSD. In these cases, it may be desirable to disable the Reference Tag checks completely by setting RT_PassThrough as disabled (i.e., cleared='0'). Disabling RT_passthrough mode will force the Reference Tag in the "outer" PI to all 0s. Also, the NVMe command PRCHK[0] is also forced to 0 to ensure that the Reference Tag is not checked on the target SSD.

Optionally, a PRCHK0_PassThrough mode may be implemented. The mode supports independent control of the checks even if the RTag is passed through. For example, a data center operator might want to make the original RTag visible in clear text to the storage target but not checked by the SSD. This is particularly relevant if the LBA is modified by the storage target.

As before, in some embodiments the RT_PassThrough mode may be configurable per NSID or per VM. Similarly, in some embodiments the PRCHK0_PassThrough mode may be configurable per NSID or per VM.

In view of the foregoing, RefTag 440 is derived from multiple inputs including an NVMe command IBLRT (Initial Logical Block Reference Tag)+block offset and NVMe command IBLRT input to a multiplexer 446 that includes a Type 1 or Type 2 control input, and a Reference Tag passthrough mode (RTpassThroughMode) 452 that is used as a control input to a multiplexer 450. As further shown, if AT_PassThroughMode 444 is set, this forces a PRCHK[1]

to be cleared to '0'. If RT_PassThroughMode 452 is set, PRCHK[0] is forced to be cleared to '0'.

Figure 4C:
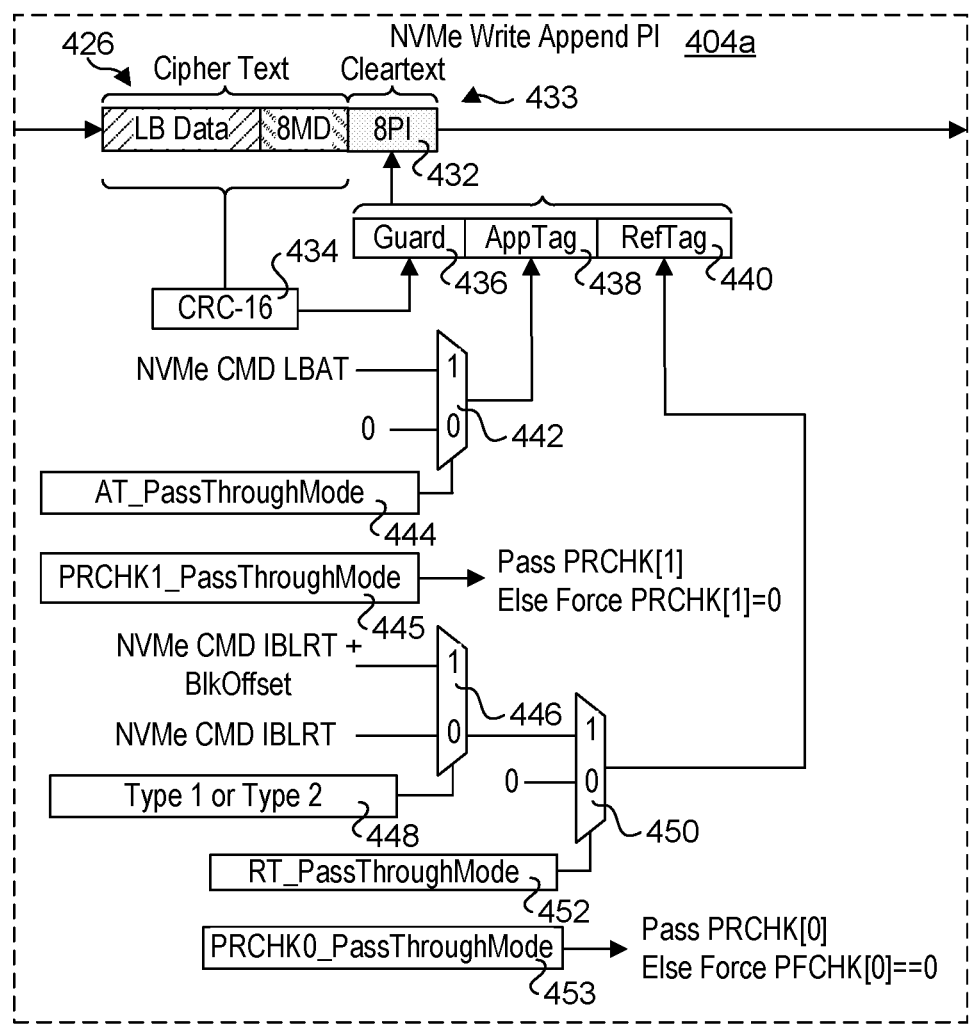
Figure 4D:
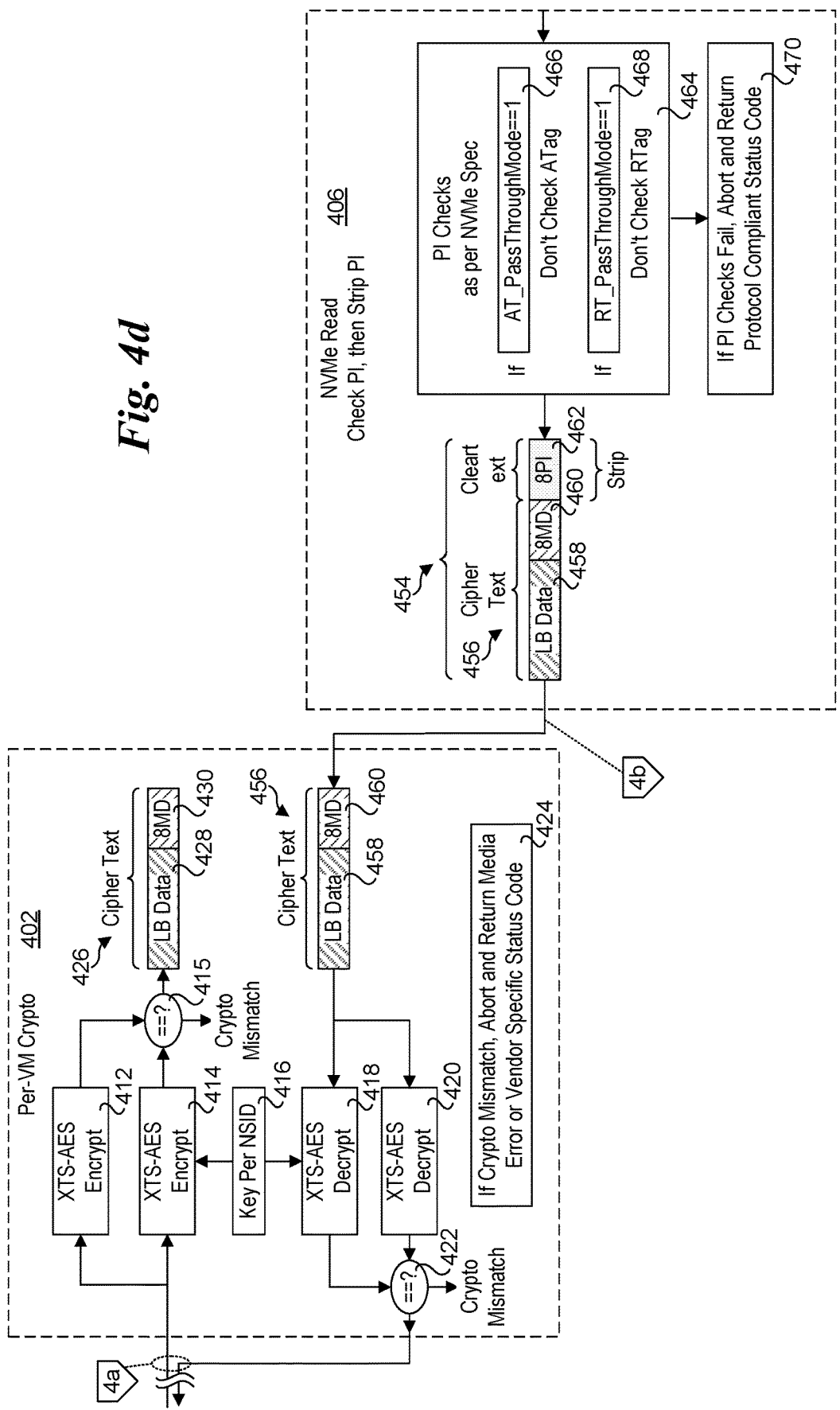

FIG. 4c shows an NVMe Write Append PI block 404a in which the optional PRCHK0_PassThrough mode and the PRCHK1_PassThrough mode are implemented, according to one embodiment. As shown in a PRCHK1_PassThroughMode block 445, if this mode is enabled the PRCHK[1] is passed through, otherwise PRCHK[1] is forced to =0. As shown in a PRCHK0_PassThroughMode block 453, if this mode is enabled the PRCHK[0] is passed through, otherwise PRCHK[0] is forced to =0.

NVMe Read

For NVMe Reads, the outer PI is checked as per NVMe protocol specification. When AT_PassThrough Mode is disabled, the Application Tag check on the "outer" PI is disabled. The mode has no effect on the "inner" PI checks. When RT_PassThrough Mode is disabled, the Reference Tag check on the "outer" PI is disabled. The mode has no effect on the "inner" PI checks. The "outer" PI is then stripped before sending to the decryption engines.

In the PRCHK[1] PassThrough mode, the checks are done if PRCHK[1] pass through mode is enabled, and the host sets PRCHK[1]. For PRCHK[0] PassThrough mode the checks are done only if PRCHK[0] PassThrough mode is enabled, and the host sets PRCHK[0].

Details of the logic implemented for NVMe Read block 406 are shown in FIG. 4c. The data to be read is stored on the SSD or other storage device as a protected data block 454 having a format similar to protected data blocks 433 and 332, which is the format of the protected data block received by NVMe protocol to fabric bridge 312 from fabric transport block 314. Protected data block 454 includes cipher text 456 comprising encrypted LB data 458 and 8B MD 460 (i.e., the inner PI for LB data 458) to which an 8B PI 462 in cleartext is appended.

In connection with Reads, NVMe Read block 406 performs PI checks, then strips the PI. Pi checks per the NVMe specification are performed in a block 564. As shown in a block 466, if the AT_PassThroughMode==1 (equal 1), AppTag 438 is not checked. Similarly, if RT_PassThroughMode==1, RefTag 440 is not checked, as shown in a block 468. If the PI checks fail, processing is aborted, and a protocol compliant status code is returned in a block 470.

Following the PI checks, the cleartext 8B outer PI is stripped, with the remaining encrypted cipher text 456 forwarded to per-VM crypto block 402. Encrypted cipher text 456 is input in parallel to XTS-AES decryption engines 418 and 420, which perform decryption of the encrypted data to output cleartext data having extended LBA format 326 (see FIG. 4a). If the comparison result performed by comparator 422 is a match, the cleartext is provided as an input to block 408 to perform a PI Read check per the NVMe spec. As before, if the PI check fails, the process is aborted, and a protocol compliant status code is returned in block 410. If the PI check passes, the cleartext form of the data block is returned to host 300.

Figure 4E:
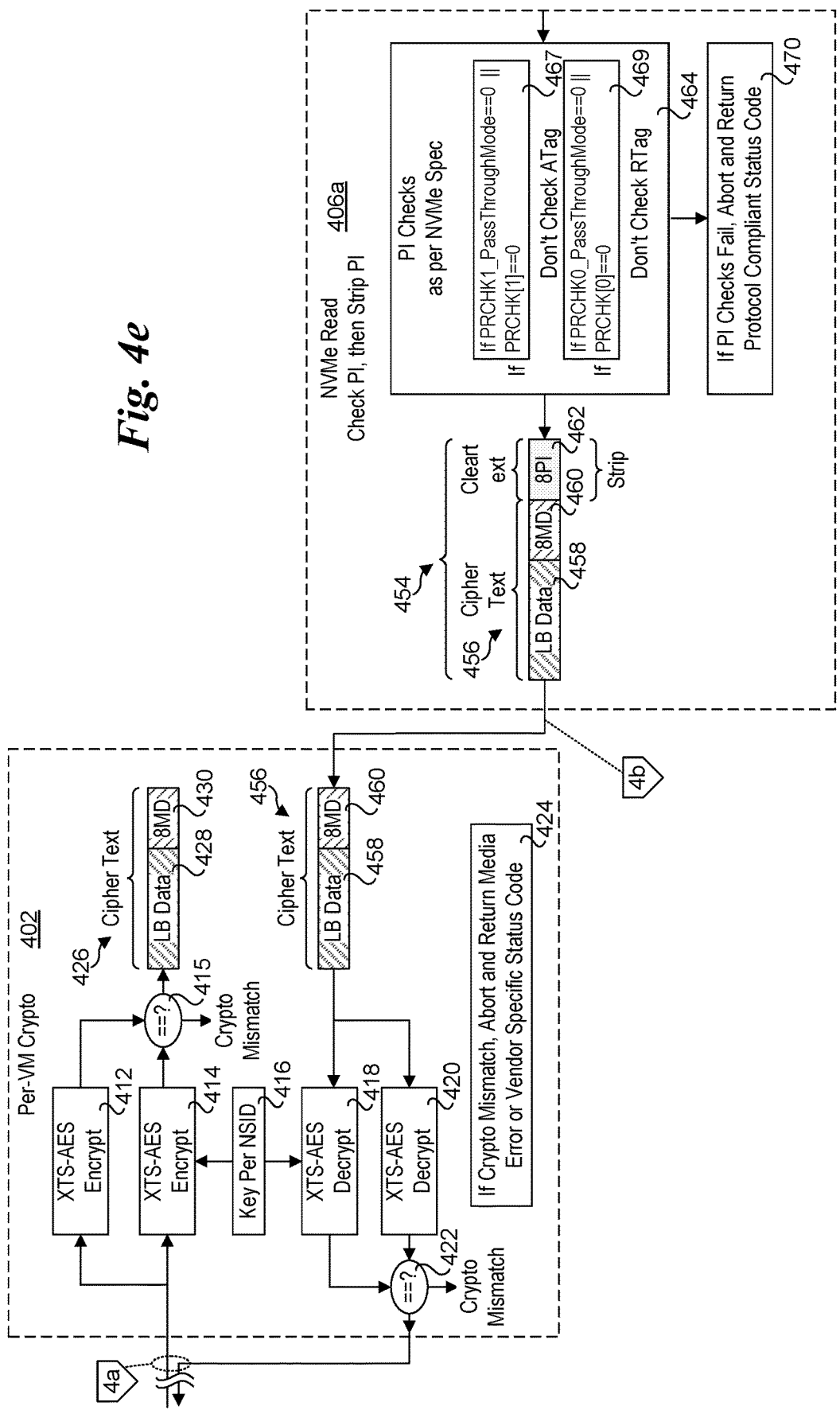

As with NVMe Writes, NVMe reads may also implement a PRCHK0_PassThrough mode and a PRCHK1_PassThrough mode in a similar manner. For example, FIG. 4e shows an alternative configuration for an NVMe Read block 406a including a PRCHK1_PassThroughMode block 467 and a PRCHK0_PassThroughMode block 469. As shown in block 467, if the PRCHK1_PassThroughMode is 0 and PRCHK[1] is cleared, the ATag is not checked. Similarly, as shown in block 469 if the PRCHK1_PassThroughMode is 0 and PRCHK[0] is cleared, the RTag is skipped.

The solution illustrated in FIGS. 3 and 4a-4e enables SmartNICs to support end-to-end protection on the target SSD even when per-VM encryption is enabled at the compute Client Node. The SmartNIC performs all the PI checks as per the NVMe specification using the original "inner" PI provided by the Host. These PI checks would normally have been done by the target SSD's NVMe controller if encryption were not enabled.

Host PRACT=1

As per the NVMe specification, the Host may use the PRACT=1 mode. In this case, the PI is inserted by the NVMe controller and not provided by the Host. To support PRACT=1 usage by the Host, the SmartNIC needs to provide the NVMe compliant functionality as illustrated in the diagram collectively shown in FIGS. 5a-5d. The difference between this process and the process associated with FIGS. 3 and 4a-4c are shown with a gray background, and include a data block 327 comprising LB data 329, an NVMe Write block 500 (FIG. 5a), and a NMVe Read block 502. The per-VM crypto block 402, NVMe Write block 404, and the NVMe Read block 406 remain the same, as shown by like-numbered components and blocks in FIGS. 4a-4c and 5a-5d.

Figure 5A:
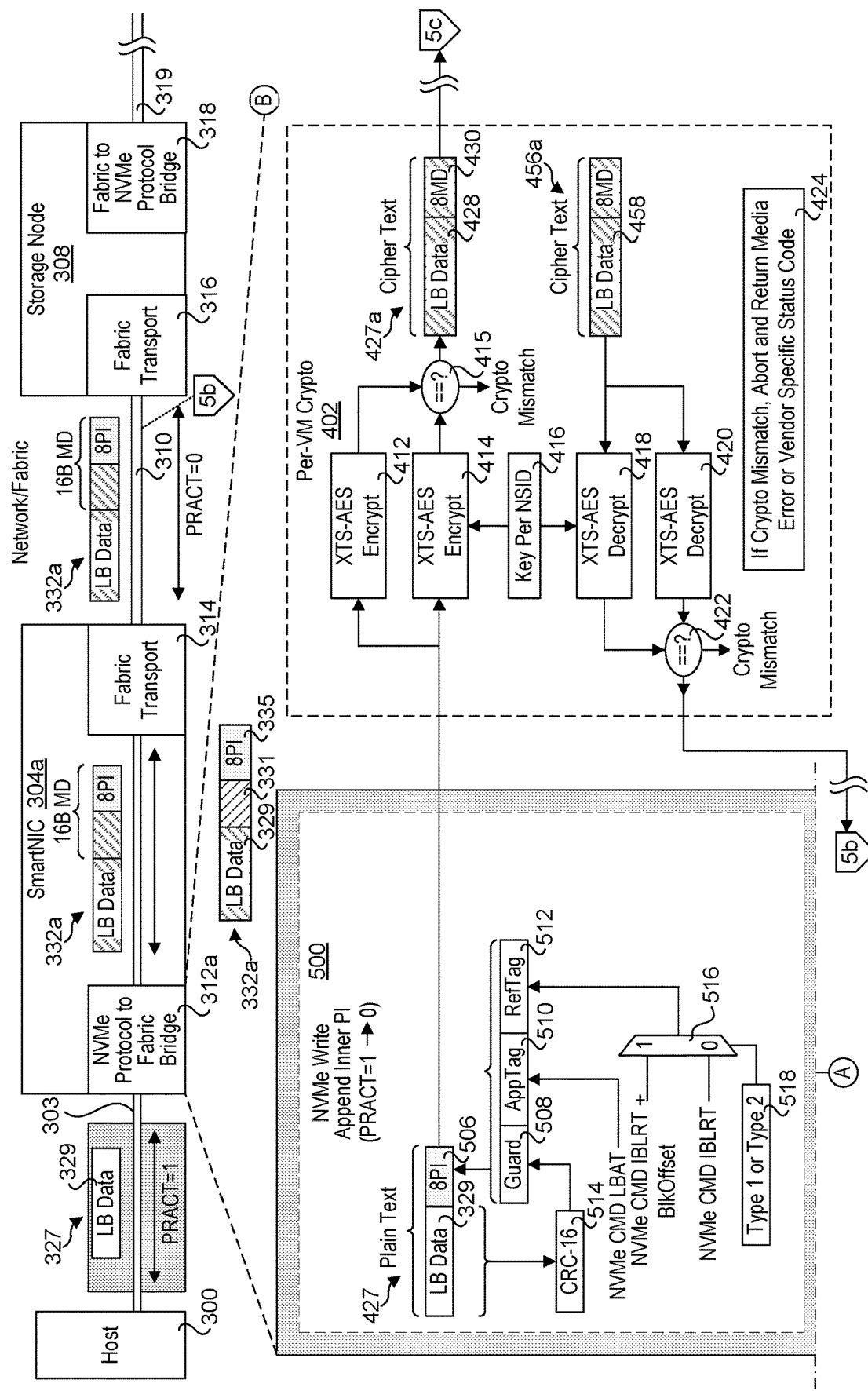
Figure 5B:
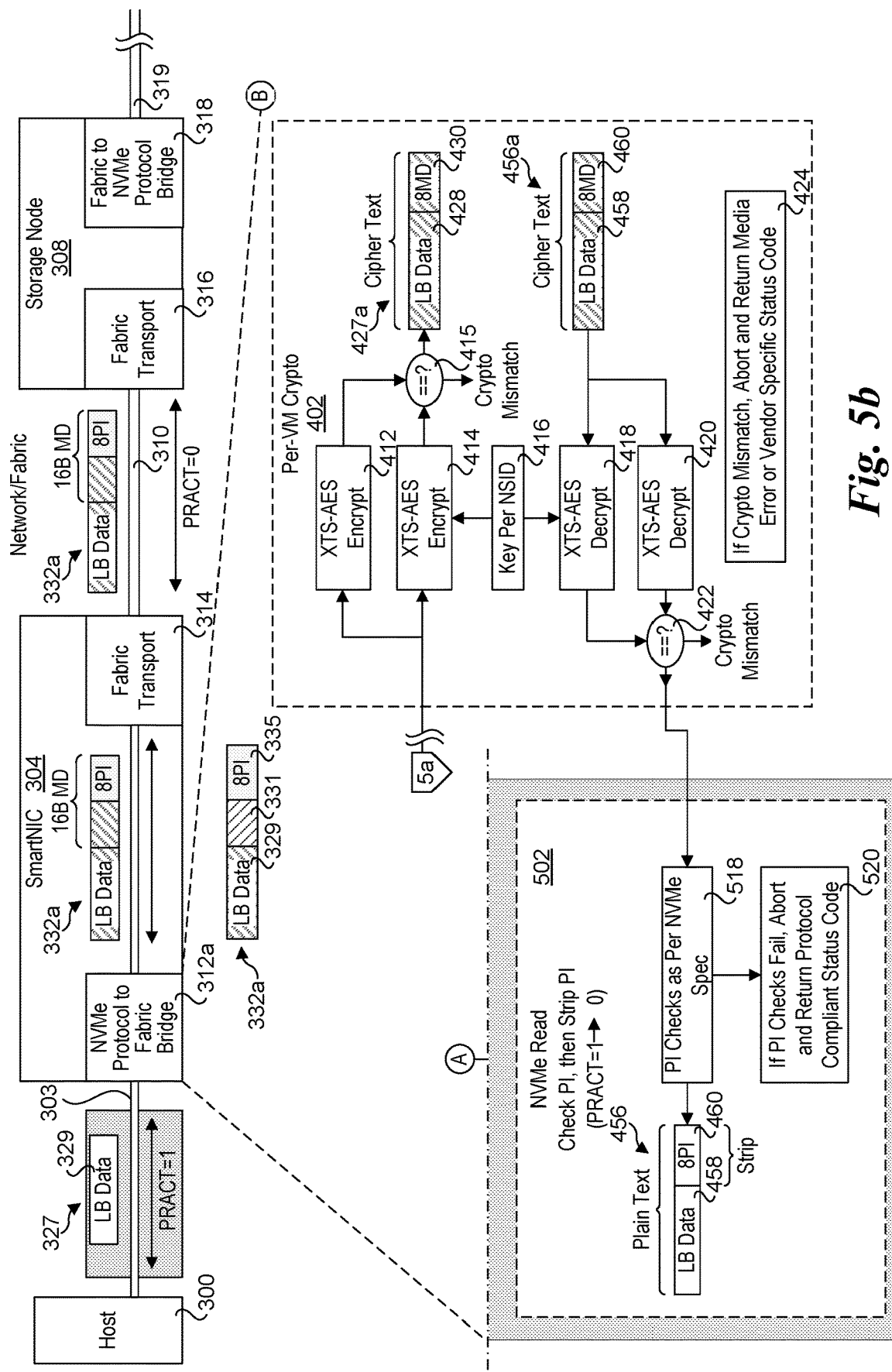
Figure 5C:
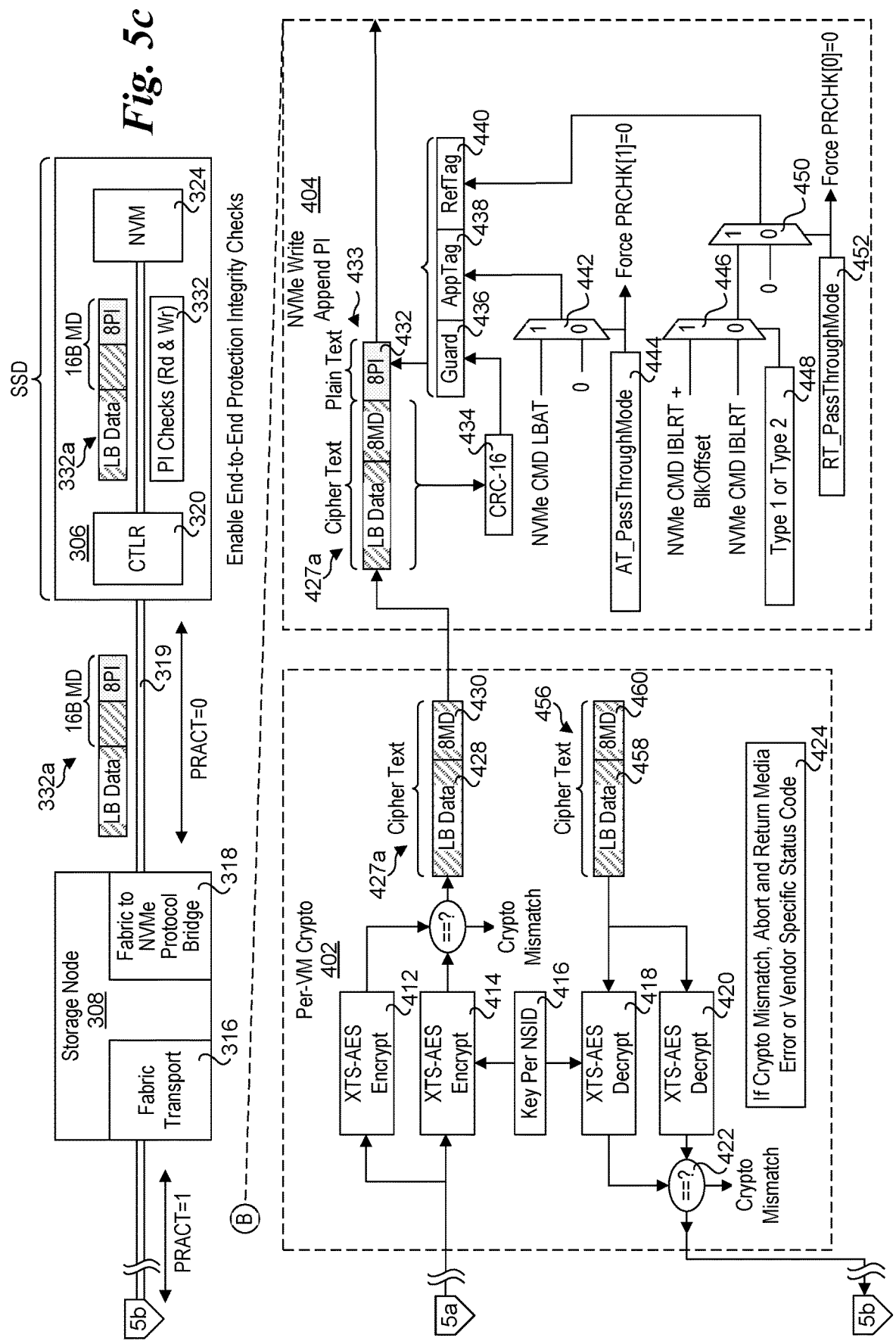

As shown at the top of FIGS. 5a, 5b, and 5c, the top-level components for the end-to-end process are substantially similar to that described above, except for SmartNIC 304 with NVMe protocol to fabric bridge 312 has been replaced with a SmartNIC 304a with an NVMe Protocol to fabric bridge 312a. The differences between the embodiments are implemented in this block.

In this instance data block 327 is transferred between host 300 and SmartNIC 304a over interconnect 303 with PRACT=1. As described above, per the NVMe specification version 1.4, when PRACT=1 and the namespace is formatted with Metadata Size equal to 8, then the logical block data is transferred from the host buffer to the controller. As the logical block data passes through the controller, the controller generates and appends protection information to the end of the logical block data, and the logical block data and protection information are written to NVM (i.e., the metadata is not resident within the host buffer). Accordingly, under this embodiment, rather than performing the data conversion at the controller, this is performed by NVMe protocol to fabric bridge 312a in SmartNIC 304a. In addition, note that while the Host uses PRACT=1 this PRACT bit is modified to PRACT=0 by SmartNIC 304a before transporting on network/fabric 310.

For an NVMe Write (moving from left to right), NVMe protocol to fabric bride 312a converts data block 327 to a protected data block 332a that includes LB data 329 in encrypted form, an encrypted inner PI 331, and an outer PI 335. The remainder of the Write process is the same as before, with protected data block 332a replacing protected data block 332. The process for an NVMe Read is the reverse, with the LB data and inner PI of protected data block 332a being decrypted, PI checks being performed with outer PI 335, and outer PI 335 being stripped, returning data block 327 to its original plain text format.

With reference to FIG. 5a, in NVMe Write block 500 data block 327 is converted to an unencrypted protected data block 427 by appending an 8B PI 506 to LB data 329. As per the NVMe spec, 8B PI 506 includes a Guard field 508, an AppTag 510, and a RefTag 512. The Guard field value is a CRC-16 calculated over LB data 329. AppTag 510 comprises the NVMe command LBAT. RefTag 512 comprises the output of a multiplexer 516 that receives inputs including an NVMe CMD IBLRT+BlkOffset and an NVMe CMD IBLRT with a Type 1 or Type 2 control input 518.

In Per-VM Crypto block 402 and NVMe Write block 404, cipher text 426 has been replaced with cipher text 427a, but otherwise the operations are the same as for the embodiment of FIGS. 3 and 4a-4c. Similarly, in Per-VM Crypto block 402 and NVMe Read block 406, Protected data block 454 has been replaced with Protected data block 454a including cipher text 456a, and cipher text 456 has been replaced with cipher text 456a in Per-VM Crypto block 402.

With reference to FIG. 5b, following decryption of cipher text 456a the output of comparator 422 comprising plain text 456 is received as an input to a block 518 in NVMe Read block 502, which performs PI checks per the NVMe specification using the unencrypted 8B PI 460. If the PI checks fail, the process is aborted, and a protocol compliant status code is returned in a block 520. When the PI checks pass, 8B PI 460 is stripped off, and LB data 458 is transferred to host 300 over interconnect 303 with PRACT=1.

As with the embodiment of FIGS. 3 and 4a-4e, the optional PRCHK0_PassThrough mode and a PRCHK1_PassThrough mode may be implemented for NVMe Writes, and NVMe Reads. For example, NVMe Write block 404 in FIG. 5c may be replaced with NVMe Write block 4a of FIG. 4c. Similarly, NVMe Read block 406 of FIG. 5d may be replaced by NVMe Read block 406a of FIG. 4e.

The foregoing diagrams show a usage of the 8 Byte Metadata standard for Protection Information which uses CRC16 algorithm. However, this is merely exemplary and non-limiting. Other embodiments may be enhanced to support other sizes of Metadata and Protection Information formats using other CRC algorithms, such as CRC32 or CRC64.

Figure 6A:
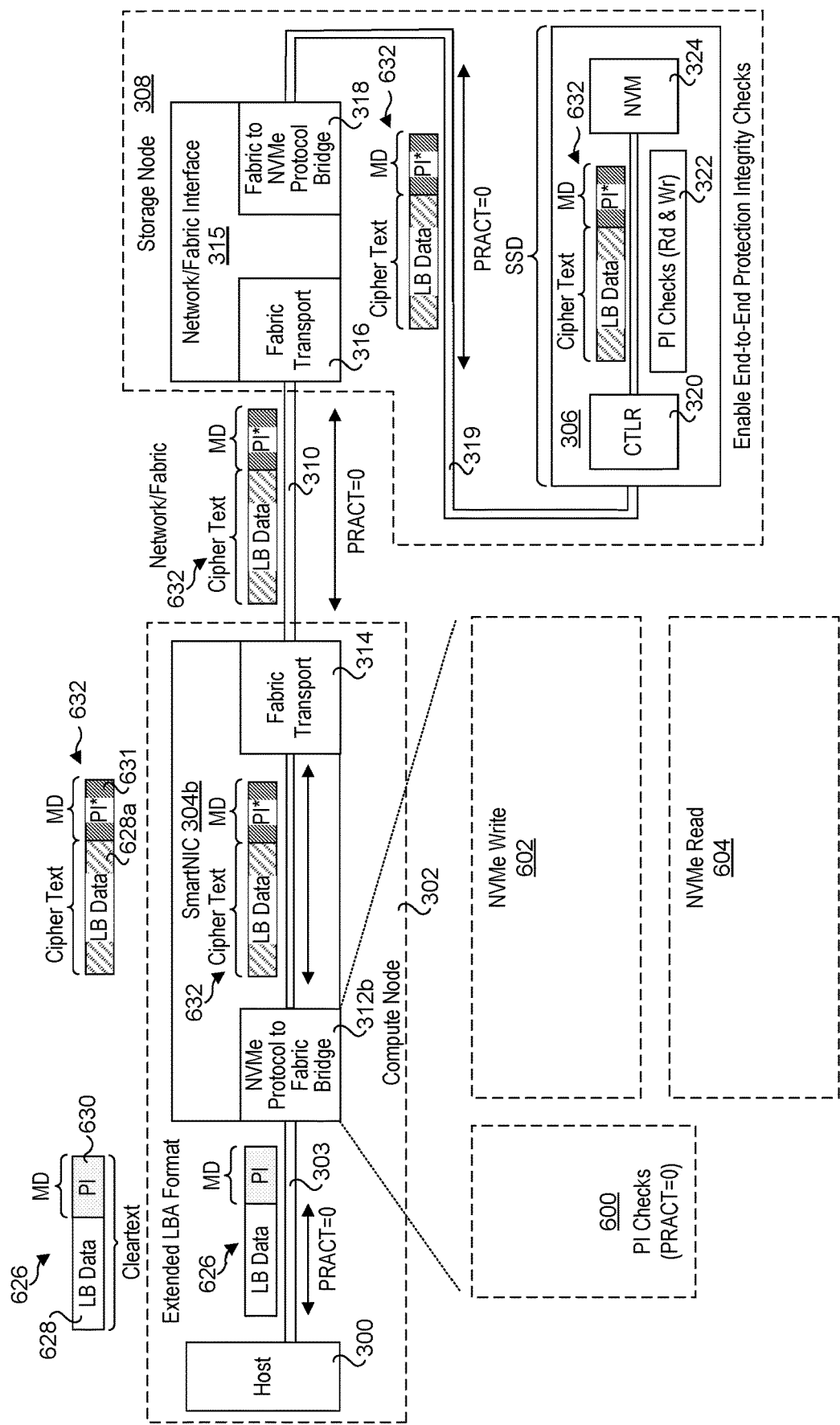
FIG. 6a is a schematic diagram illustrating an enhanced end-to-end data protection scheme for data transferred between a host including a NIC and a storage node coupled to the NIC via a network or fabric that provides an additional mode of operation that does not append or grow the PI/Metadata.
Figure 6B:
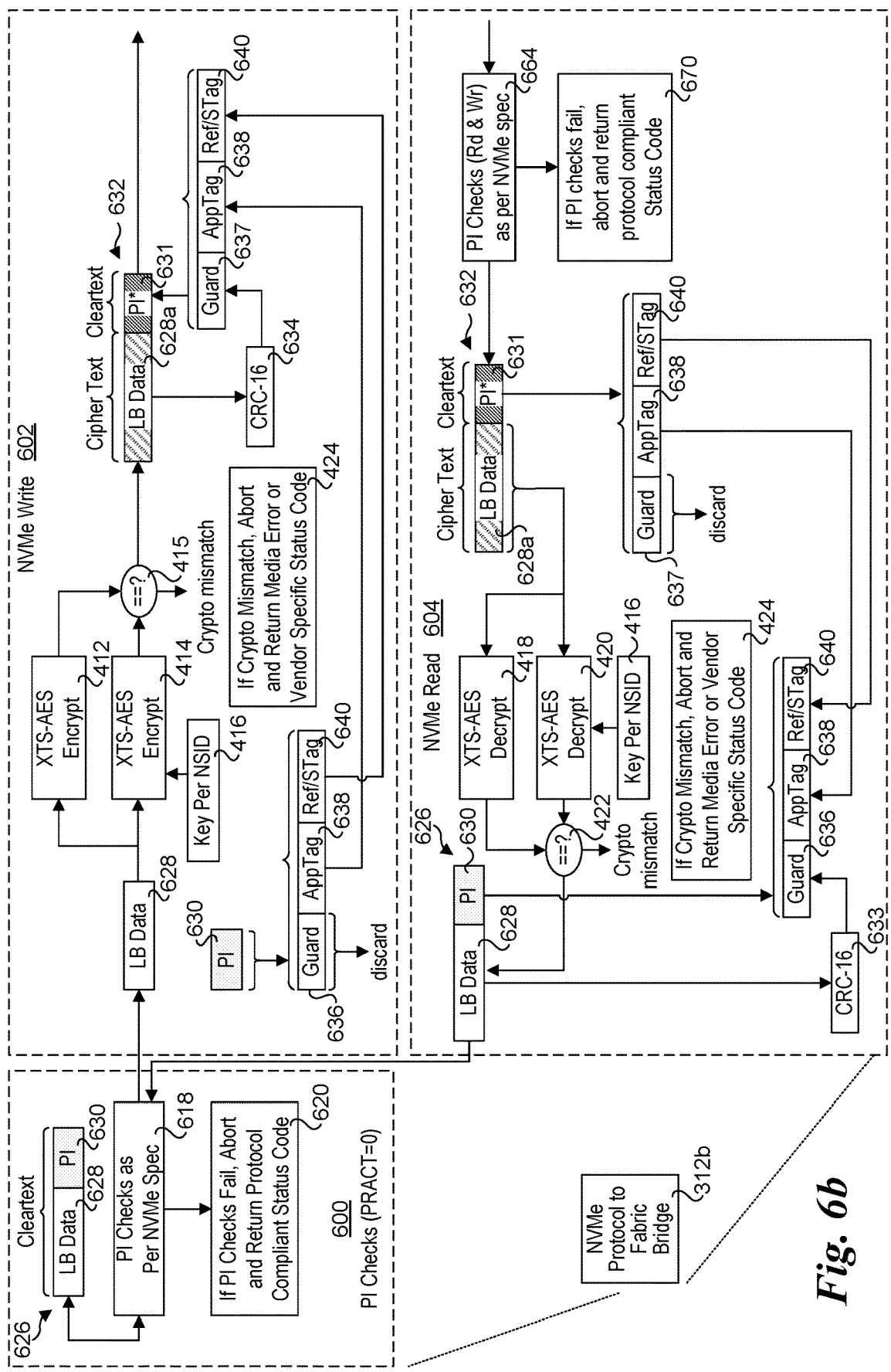

With reference to FIGS. 6a and 6b, an enhanced solution that provides an additional mode of operation that does not append or grow the PI/Metadata. Generally, the PI/MD may be a fixed size such as but not limited to 8B or 16B. This solution also supports recent revisions to the NVMe specification, and introduces a new combined RefTag/Stag field within the PI/MD. FIG. 6a shows the end-to-end transfer at an abstracted level while FIG. 6b shows details of the logic blocks implemented for NVMe protocol to fabric bridge 313.

With reference to FIG. 6a, the components for the end-to-end data transfer with protection integrity are the same as those shown in FIG. 3 with the exception that SmartNIC 304 has been replaced with a SmartNIC 304b including an NVMe protocol to fabric bridge 312b. An NVMe Write operation proceeds as follows. A data block 626 having an extended LBA format includes LB data 628 and PI/MD 630, which is stored as cleartext on host 300. At NVMe protocol to fabric bridge 312b, a protected data block 632 is generated by encrypting LB data 628, as depicted by cipher text 628a and regenerating PI/MD 630 as PI*631. This process is illustrated in FIG. 6b and described below. Protected data block 632 is then forwarded throughout the rest of the forwarding path for an NVMe Write operation from fabric transport block 314 to fabric transport block 316 to fabric to NVMe protocol bridge 318 to SSD 306. At SSD 306, PI checks 322 are performed prior to Writing protected data block 632 to NVM 324.

An NVMe Read operation entails the reverse of the NVMe Write operations. The Read data is stored in NVM 324 as a protected data block 632, which is forwarded from SSD 306 to storage node 308 via network/fabric 310 to a receive port on SmartNIC 304b and forwarded internally from fabric transport block 314 to NVMe protocol to fabric bridge 312b. At NVMe protocol to fabric bridge 312b, the encrypted cipher text is decrypted and PI checks are performed, with the output of NVMe protocol to fabric bridge comprising the original form of data block 626 having the extended LBA format.

As shown in FIG. 6b, the top-level blocks include a PI checks block 600, an NVMe Write block 602, an and NVMe Read block 604. For PI checks block 600, PRACT=0, and includes a block 618 in which Write and Read PI checks are performed per the NVMe specification. If a PI check fails, the process is aborted, and a protocol compliant status code is returned.

NVMe Write block 602 includes XTS-AES encryption engines 412 and 414, a comparator 415, per NSID key 416, and crypto mismatch block 424 which are configured and operate in a similar manner to like-numbered components described above. For a NVMe Write, LB data 628 and PI 630 are split and processed separately. LB data 628 is provided in parallel to XTS-AES encryption engines 412 and 414 which encrypt the data to produce cipher test comprising encrypted LB data 628a. If comparator 415 detects a mismatch, the logic proceeds to block 424, wherein the process is aborted, and a media error or vendor specific status code is returned. PI 630 includes a Guard field 636, an AppTag 638, and a combined RefTag/Stag field (Ref/Stag) 640. Guard field 636 is discarded.

Continuing toward the right side of NVMe Write block 692, the cipher text comprising encrypted LB data 628a is combined with a regenerated PI*631. Guard field 637 comprises a CRC-16 634 calculated over encrypted LB data 628a. Each of AppTag 638 and Ref/Stag 640 are copied from PI 630.

As shown in NMVe Read block 604 includes XTS-AES decryption engines 418 and 420, a comparator 422, per NSID key 416, and a crypto mismatch block 424. Beginning at the right-hand side of NMVe Read block 604, a protected data block 632 comprising encrypted LB data 628a and PI* 631 is processed through a block 664 to perform PI Read checks per the NVMe specification. If PI checks fail, the process is aborted, and a protocol compliant status code is returned in a block 670. After passing the PI checks, protected data block 632 is split up, with encrypted LB data 628a provided in parallel as inputs to XTS-AES decryption engines 418 and 420, which perform decryption operations to return LB data 628 to its original cleartext format. If comparator 422 detects a mismatch, the process is aborted, and a media error or vender specific status code is returned in block 424. Guard 637 of PI*631 is discarded, and AppTag 638 and RefStag 640 are copied into these same fields in PI 630. Guard 636 is generated by calculating a CRC-16 633 over LB data 628. This returns the format of the Read data to data block 626 having the extended LBA format. Data block 626 is then forwarded to PI checks block 600. In block 618, PI checks are performed using PI 630. If the PI checks fails, the process aborts and a protocol compliant status code is returned. When the PI checks pass, data block 626 is forwarded to host 300 over interconnect 303 or directly written to a memory buffer on the host using a DMA Write.

NIC Architecture

Figure 7:
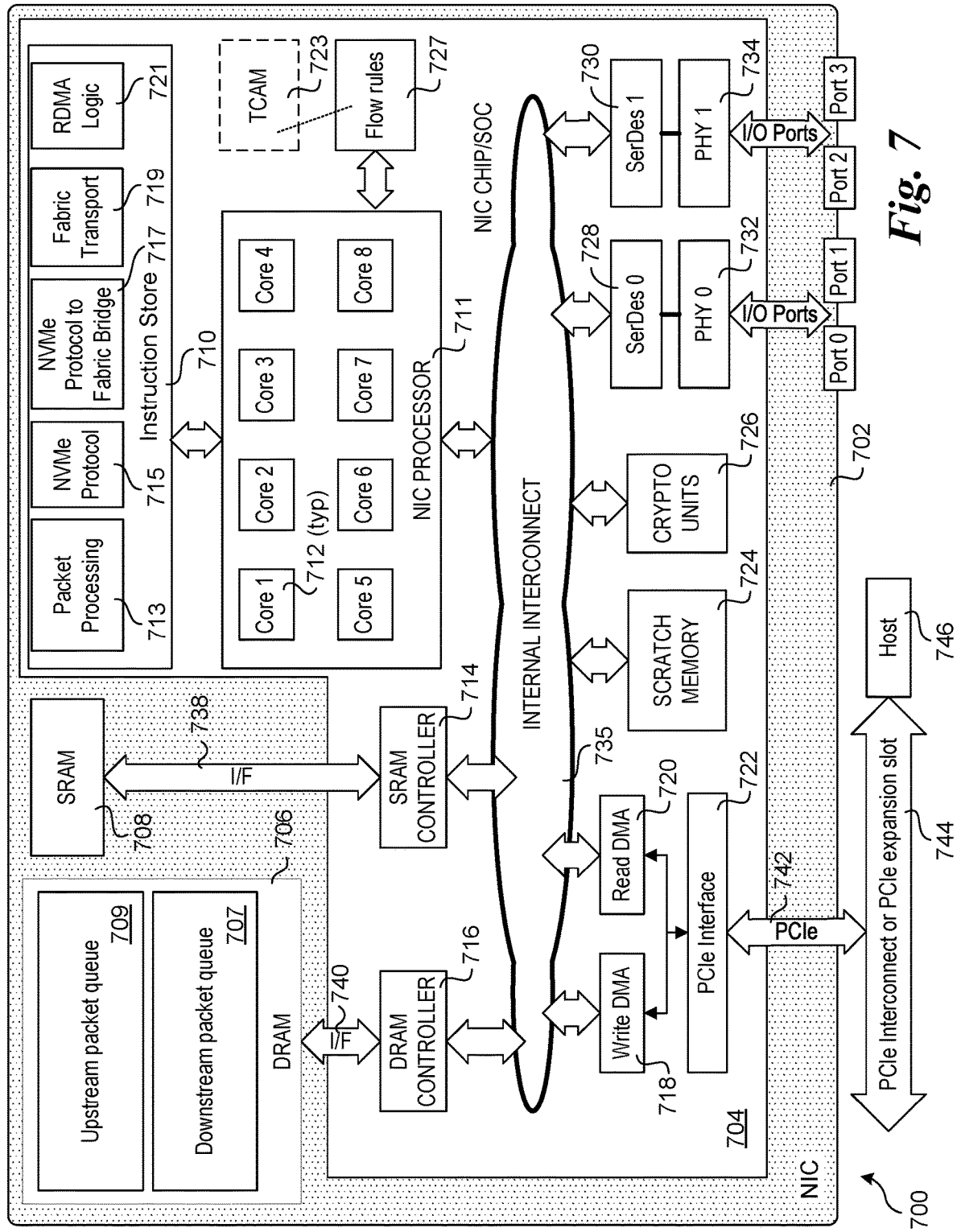
FIG. 7 is a schematic diagram of an exemplary system architecture for a NIC configured to implement aspects of the embodiments disclosed herein.

An exemplary system architecture for a NIC 700 is shown in FIG. 7. NIC 700 includes a NIC system board 702 on which a NIC Chip/SoC (System on a Chip) 704, Dynamic Random Access Memory (DRAM) 706 and Static Random Access Memory (SRAM) 708 are mounted. Under various embodiments. NIC system board 702 is representative of an network (e.g., Ethernet) controller card, a Host Fabric Interface (HFI), a daughter board, a multi-chip module board or substrate, or it may be part of a computer system board, such as a main board or motherboard for a computer server. NIC Chip/SoC 704 is representative of a Network or Fabric processing and/or control unit, and may be embodied in various forms, including as an Ethernet controller chip or a network processor unit (NPU).

In the illustrated embodiment, NIC Chip/SoC 704 includes an instruction store 710, a NIC processor 711 including multiple cores 712, an SRAM controller 714, a DRAM controller 716, a Write DMA block 718, a Read DMA block 720, a PCIe interface 722, an optional TCAM (ternary content-addressable memory) 723, a scratch memory 724, one or more crypto units 726, Serializer/Deserializers (SerDes) 728 and 730, and PHY interfaces 732 and 734. Each of the components is interconnected to one or more other components via applicable interconnect structure and logic that is collectively depicted as an internal interconnect cloud 735.

Instruction store 710 includes various instructions that are executed by cores 712, including Packet Processing instructions 713, NVMe protocol instructions, instructions for NVMe protocol to fabric bridge 717, fabric transport instructions 719 and RDMA logic instructions 721. Under one embodiment, various packet processing operations are performed using a pipelined architecture. As an alternative, the combination of cores 712 and instruction store 710 may be implemented using embedded programmable logic, such as via a Field Programmable Gate Arrays (FPGA) or the like.

In one embodiment, instruction store 710 is implemented as an on-chip store, such as depicted in FIG. 7. Optionally, a portion or all the instructions depicted in instruction store 710 may be stored in SRAM 708 and accessed using SRAM controller 714 via an interface 738. SRAM 708 may also be used for storing selected data and/or instructions relating to packet processing operations.

Memory in DRAM 706 is used for downstream packet queue 707 and upstream packet queue 709 and is accessed using DRAM controller 716 via an interface 740. Write DMA block 718 and Read DMA block 720 are respectively configured to support DMA Write and Read operations in accordance with the embodiments described herein. In the illustrated embodiment, DMA communication between DRAM 706 and a platform host circuitry is facilitated over PCIe interface 722 via a PCIe link 742 coupled to a PCIe interconnect or PCIe expansion slot 744, enabling DMA Write and Read transfers between DRAM 706 and system or host memory for a host 746 using the PCIe protocol.

In addition to PCIe, other interconnect technologies and protocols may be used. For example, these include but are not limited to Computer Express Link (CXL), InfiniBand, and Omni-Path.

Scratch memory 724 and crypto units 726 are illustrative of components employed by NICs for facilitating scratch memory and crypto graphic operations employed by the embodiments described above. For example, crypto units 726 are representative of XTS-AES encryption and decryption engines.

PHYs 732 and 734 facilitate Physical layer operations for the NIC, and operate as a bridge between the digital domain employed by the NIC logic and components and the analog domain employed for transmitting data via electrical, optical or wired signals. For example, in the illustrated embodiment of FIG. 7, each of PHYs 732 and 734 is coupled to a pair of I/O ports configured to send electrical signals over a wire or optical cable such as a high-speed Ethernet cable. Optical and wireless signal embodiments would employ additional circuitry and interfaces for facilitating connection via optical and wireless signals (not shown). In conjunction with PHY operations, SerDes 728 and 730 are used to serialize output packet streams and deserialize inbound packet streams.

Generally, a NIC may be configured to store routing data for facilitating packet identification and flow classification, including forwarding filters and rules either locally or using a memory-mapped IO (MMIO) address space in system or host memory. When stored locally, this routing data may be stored in either DRAM 706 or SRAM 708. Routing data stored in a MMIO address space may be accessed by NIC 700 via Read and Write DMA operations. Generally, setting up MMIO address space mapping may be facilitated by a NIC device driver in coordination with the operating system. The NIC device driver may also be configured to enable instructions in instruction store 710 to be updated via the operating system. Optionally, the instructions in instruction store may comprise firmware instructions that are stored in non-volatile memory, such as Flash memory, which may either be integrated on NIC Chip/SoC 704 or mounted to NIC system board 702 (not shown).

As an option to using DRAM 706 or SRAM 708, flow rules 727 may be implemented in hardware-based logic such as a FPGA or other programmable logic device coupled to NIC processor 711. Hash unit 726 may be implemented in the same hardware-based logic as that used for flow rules 727. Flow rules 727 may also be implemented using TCAM 723.

NIC processor 711 may employ any suitable processor architecture in current use or developed in the future. In one embodiment, the processor architecture is an Intel® x86 architecture, an IA-32 architecture or an IA-64 architecture. In one embodiment, the NIC processor architecture is an ARM®-based architecture. Other processor architectures may also be used.

Generally, the functionality provided by embodiments of NICs disclosed herein may be implemented via one or more forms of embedded logic. As used herein, including the claims, embedded logic comprises various forms of circuitry with or configured to implement logic including but not limited to processors, CPUs, microengines, microcontrollers, FPGAs and other programmable logic devices, ASICs (Application Specific integrated Circuits), Graphic Processing Units (GPUs), and various forms of accelerators, etc. The logic may be implemented by programming the physical hardware (e.g., for FPGAs and other programmable logic devices and ASICs) and/or via execution of instructions on one or more processing elements, such as a processor core, microengine, microcontroller, and processing elements in GPUs and accelerators. Hybrid devices may be implemented with more than one form of embedded logic, such as a NIC that includes a processing pipeline that is implemented via a combination of pre-programmed or dynamically programmed hardware circuitry and one or more processing elements on which firmware or embedded software are executed.

Example Platform

Figure 8:
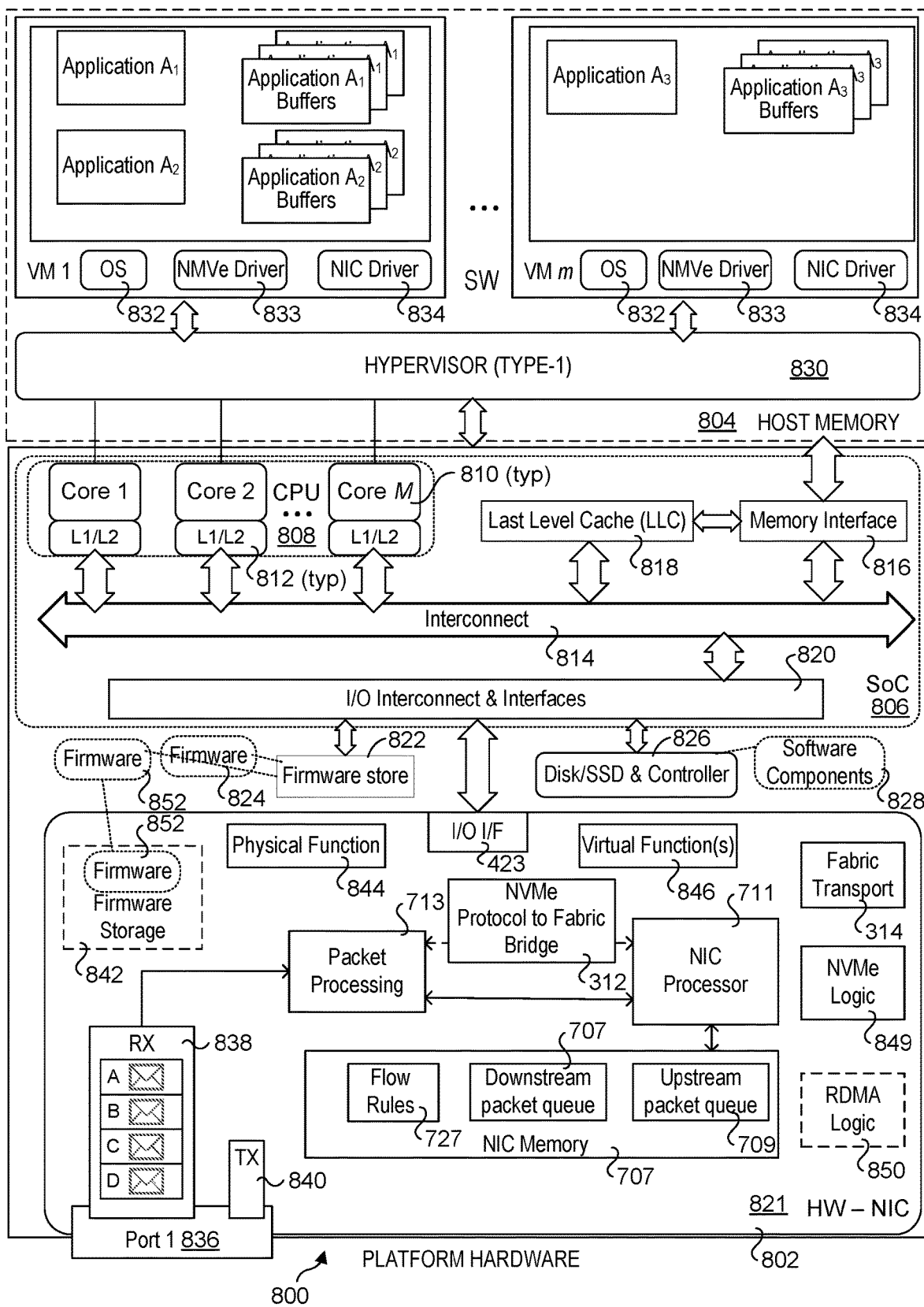
FIG. 8 is a schematic diagram of a computing platform including a NIC configured to implement aspects of the embodiments disclosed herein.

FIG. 8 shows one embodiment of a platform architecture 800 corresponding to a computing platform suitable for implementing aspects of the embodiments described herein. Architecture 800 includes a hardware layer in the lower portion of the diagram including platform hardware 802, and a software layer that includes software components running in host memory 804.

Platform hardware 802 includes a processor 806 having a System on a Chip (SoC) architecture including a central processing unit (CPU) 808 with M processor cores 810, each coupled to a Level 1 and Level 2 (L1/L2) cache 812. Each of the processor cores and L1/L2 caches are connected to an interconnect 814 to which each of a memory interface 816 and a Last Level Cache (LLC) 818 is coupled, forming a coherent memory domain. Memory interface is used to access host memory 804 in which various software components are loaded and run via execution of associated software instructions on processor cores 810.

Processor 806 further includes an Input/Output (I/O) interconnect hierarchy, which includes one or more levels of interconnect circuitry and interfaces that are collectively depicted as I/O interconnect & interfaces 820 for simplicity. Various components and peripheral devices are coupled to processor 806 via respective interfaces (not all separately shown), including a NIC 821 via an I/O interface 823, a firmware storage device 822 in which firmware 824 is stored, and a disk drive or solid state disk (SSD) with controller 826 in which software components 828 are stored. Optionally, all or a portion of the software components used to implement the software aspects of embodiments herein may be loaded over a network (not shown) accessed, e.g., by network controller 821. In one embodiment, firmware 824 comprises a BIOS (Basic Input Output System) portion and additional firmware components configured in accordance with the Unified Extensible Firmware Interface (UEFI) architecture.

During platform initialization, various portions of firmware 824 (not separately shown) are loaded into host memory 804, along with various software components. In architecture 800 of FIG. 8 the software components include a Type-1 hypervisor 830, also known as a "bare-metal" hypervisor. Optionally, a Type-2 hypervisor may be used (not shown). One of the primary differences between a Type-1 hypervisor and a Type-2 hypervisor is the Type-2 hypervisor is implemented as an application running on host operating system, while in a Type-1 hypervisor the hypervisor runs directly on the platform hardware without a host operating system (e.g., it runs on the "bare metal" of the platform, hence the name). Yet another option, a container-based virtualization environment may be implemented in which application are run in containers that are run over a virtualization layer, such as Docker®-type containers.

Under platform architecture 800, each of m virtual machines (VMs) VM 1 . . . VM m includes an operating system (OS) 832, an NVMe driver 833, and NIC driver 834. For illustrative purposes, the memory space for VM 1 is shown including applications $A_1$ and $A_2$ and associated buffers, with the memory space for VM m is shown including application $A_3$ and associated buffers. In practice, many more applications and associated buffers may be implemented. Platform architecture employing containers, such as Docker-type containers, may be implemented in a similar manner. In addition, computing platforms that only run a single instance of an operating system may also be used.

In FIG. 8, NIC 821 is depicted as including circuitry and logic for implementing the hardware device functionality for SmartNICs 304, 304*a*, and 304*b*, in addition to circuitry and logic for performing packet processing 713 and associated operations. NIC 821 further includes a NIC processor 711, and NIC memory 706 containing flow rules 727, a downstream packet queue 707, and an upstream packet queue 709. NIC 821 is further depicted as including a port 836 having a receive (RX) buffer 838 and a transmit (TX) buffer 840, an optional firmware storage device 842, a physical function 844, one or more virtual functions 846, fabric transport logic 314, NVMe logic 849, and optional RDMA logic 850. Generally, firmware 852 may be stored on-board network controller 821, such as in a firmware storage device 842, or loaded from another firmware storage device on the platform external to network controller 821 during pre-boot, such as from firmware store 822.

In addition to the illustrated components and logic blocks, NIC 821 may include additional circuitry and logic for implement aspects of SmartNICs, such as circuitry and logic for off-loading packet processing operations including identifying packet flows, generating hardware descriptors, supporting Receive Side Scaling, and DMA'ing hardware descriptors and packet data to various hardware descriptor queues and receive buffers in host memory 804.

Generally, a NIC may include one or more ports similar to port 836, where each port includes a receive port and a transmit port (optionally referred to as input and output ports, respectively). As packet data is received from a network or fabric (that would be linked with via a link coupled to port 836), PHY and MAC Layer operations are performed to extract packet data. On the receive side, the packet data is buffered in RX buffer 838, which may be implemented as a buffer or a queue, such as a circular FIFO (First-in, First-out) buffer. As shown in FIG. 8, a sequence of packets A, B, C, and D for a packet flow has been received at port 836 and is queued in RX buffer 838.

Optional RDMA logic 850 may be implemented to support RDMA operations. The RDMA operations may include conventional RDMA operations employ RDMA verbs and RDMA semantics, as well as virtual RDMA (vRDMA) operations implemented using extension to RDMA verbs and RDMA semantics to support RDMA transfers in virtual environments.

Physical function 844 and virtual functions 846 enable NIC 821 to be operated as an SR-IOV (Single Root IO virtualization) endpoint. These hardware components/logic in combination with software-based components in hypervisor 830, the VMs, and/or operating systems 832 virtualize the NIC 821's physical resources to enable software applications to access those resources.

Figure 8A:
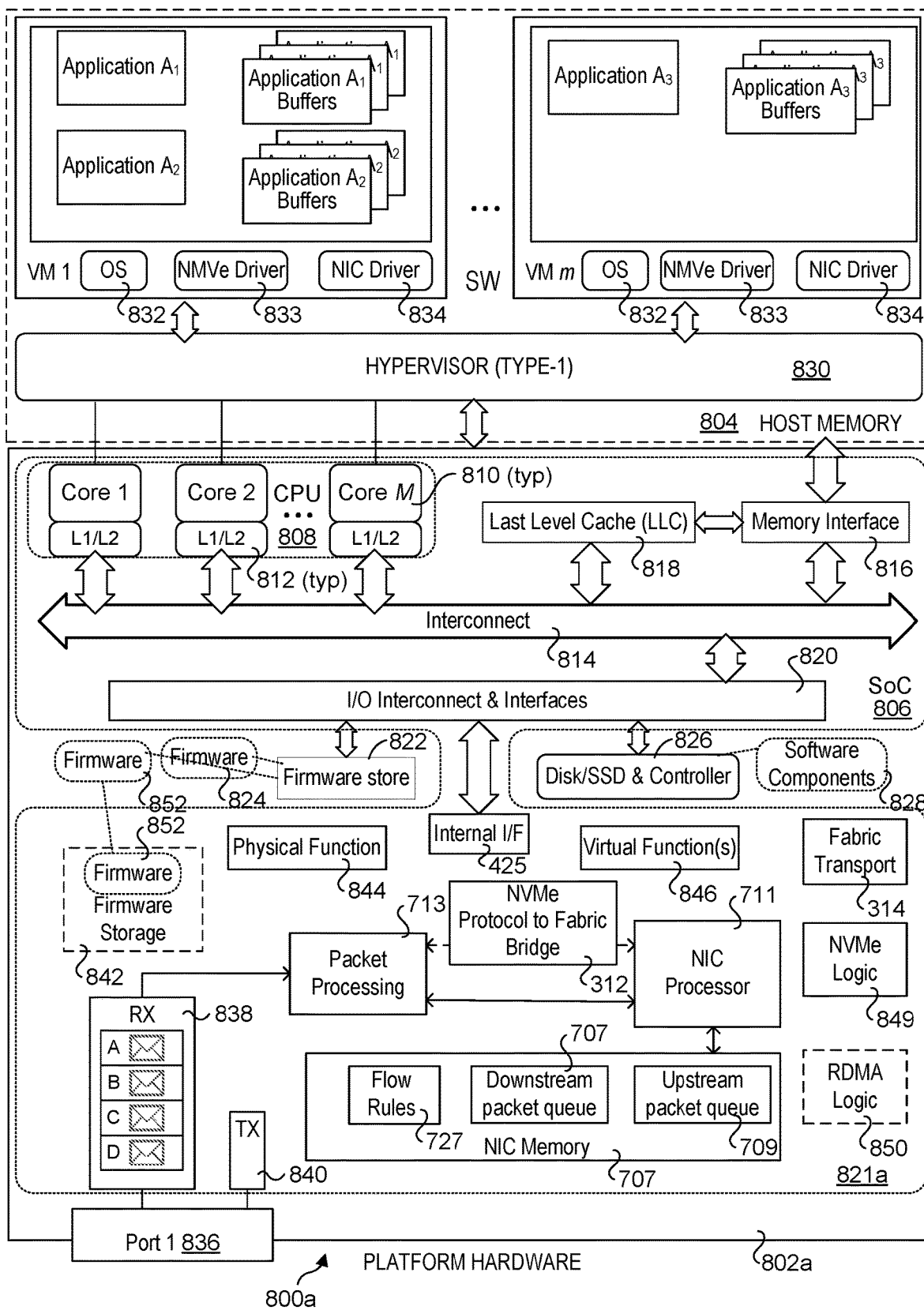
FIG. 8a is a schematic diagram of a computing platform including a processor SoC having an embedded NIC configured to implement aspects of the embodiments disclosed herein.

FIG. 8*a* shows a platform architecture 600*a* including an SoC 606*a* having an integrated NIC 821*a* configured in a similar manner to NIC 821 in platform architecture 800, with the following differences. Since NIC 821*a* is integrated in the SoC it includes an internal interface 825 coupled to interconnect 814 or another interconnect level in an interconnect hierarchy (not shown). RX buffer 838 and TX buffer 840 are integrated on SoC 806*a* and are connected via wiring to port 836*a*, which is a physical port having an external interface. In one embodiment, SoC 806*a* further includes I/O interconnect and interfaces and platform hardware includes firmware, a firmware store, disk/SSD and controller and software components similar to those shown in platform architecture 800.

The CPUs 808 in SoCs 806 and 806*a* may employ any suitable processor architecture in current use or developed in the future. In one embodiment, the processor architecture is an Intel® architecture (IA), including but not limited to an Intel® x86 architecture, and IA-32 architecture and an IA-64 architecture. In one embodiment, the processor architecture is an ARM®-based architecture.

In the foregoing embodiments, the term SmartNIC is used. A SmartNIC, or simply NIC as used in the following claims is intended to cover any network interface, network adaptor, network interface controller, network interface card, fabric interface (e.g., Host Fabric Interface (HFI), or host controller adaptor (HCA) that includes embedded logic for implementing the functionality provided by embodiments of the SmartNIC described herein. More generally, a SmartNIC is a type of infrastructure processor unit (IPU).

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'm', M, etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, FPGAs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for implementing end-to-end integrity protection for transfer of data blocks between a host and a storage node comprising:
for a Write operation,
transferring a data block including logical block (LB) data from a memory buffer in the host to a Network Interface Controller (NIC);
at the NIC,
encrypting the data block;
appending the encrypted data block with protection information (PI) generated using data in the data block to generate a protected data block; and
forwarding the protected data block from a transmit port of the NIC onto a network or fabric to be delivered to the storage node,
wherein the data block transferred from the memory buffer in the host has an extended logical block address (LBA) format comprising LB data concatenated with an inner PI calculated over the LB data, and wherein the PI in the protected data block comprises an outer PI.

2. The method of claim 1, wherein the Write operation comprises a Non-Volatile Memory Express (NVMe) Write operation and the protected data block has a format compliant with an NVMe specification.

3. The method of claim 1, further comprising:
at the NIC,
generating first PI using data in the LB data;
concatenating the LB data with the first PI and encrypting the concatenated LB data and first PI; and
generating a second PI based on the encrypted concatenated LB data and first PI,
wherein the first PI is an inner PI and the second PI is an outer PI.

4. The method of claim 1, further comprising:
for a Read operation;
at the NIC,
receiving a protected data block read from a storage device accessed via the storage node and transferred from the storage node via the network or fabric to a receive port on the NIC, the protected data block comprising cipher text including an encrypted payload data concatenated with an encrypted inner PI an outer PI generated from the cipher text;
performing one or more PI checks on the cipher text using the outer PI;
stripping off the outer PI;
decrypting the cipher text to generate payload data and the inner PI;
performing one or more PI checks on the payload data using the inner PI; and
forwarding at least the payload data to the host or writing the payload data to a memory buffer in the host using a Direct Memory Access (DMA) Write.

5. The method of claim 4, wherein the Read operation comprises a Non-Volatile Memory Express (NVMe) Read operation and each of the outer PI and unencrypted form of the inner PI have a PI format compliant with an NVMe specification.

6. The method of claim 4, wherein the payload data comprises LB data,
further comprising:
at the NIC,
writing the LB data concatenated with the inner PI as a data block having an extended LBA (Logical Block Address) format to a memory buffer on the host.

7. The method of claim 4, wherein the payload data comprises LB data,
further comprising:
at the NIC,
when the one or more PI checks on the payload data pass,
stripping off the inner PI; and
writing the LB data to a memory buffer on the host using a direct memory access (DMA) Write.

8. The method of claim 1, wherein encrypting the data block comprises:
performing encryption of the data block in parallel using two encryption engines to generate respective encrypted cipher text outputs;
comparing the encrypted cipher text outputs to detect for a match; and
when the encrypted cipher text outputs match, forwarding the encrypted cipher text for further processing.

9. The method of claim 1, further comprising:
for a second Write operation,
transferring a second data block from a memory buffer in the host to the NIC, the second data block including payload data appended with first metadata comprising first PI;
at the NIC,
encrypting the payload data;
generating second metadata comprising second PI derived from the encrypted payload data and the first PI and replacing the first metadata with the second metadata to generate a second protected data block; and
forwarding the second protected data block from a transmit port of the NIC onto a network or fabric to be delivered to the storage node.

10. A Network Interface Controller (NIC), configured to be installed in or coupled to a host, comprising:
one or more receive ports;
one or more transmit ports;
an input/output (I/O) interface configured to be coupled via a link to an I/O interface on the host; and
embedded logic configured to:
in connection with a first Write operation,
receive a first data block from the host or retrieve a first data block from a memory buffer on the host, the first data block comprising logical block (LB) data including payload data appended with first metadata comprising first protection information (PI) generated using data in the LB data;
concatenate the LB data with the first PI and encrypt the concatenated LB data and first PI;
generate second metadata comprising a second PI based on the encrypted concatenated LB data and first PI, wherein the first PI is an inner PI and the second PI is an outer PI; and
forward the protected data block from a transmit port onto a network or fabric coupled to the transmit port to be delivered to a storage node coupled to the network or fabric.

11. The NIC of claim 10, wherein the Write operation comprises a Non-Volatile Memory Express (NVMe) Write operation and the protected data block has a format compliant with an NVMe specification.

12. The NIC of claim 10, wherein the embedded logic is further configured to:
in connection with second Write operation,
receive a second data block from the host or retrieve a second data block from a memory buffer on the host;
encrypt the second data block;
append the encrypted data block with PI generated from data in the second encrypted data block to generate a second protected data block; and
forward the second protected data block from a transmit port onto the network or fabric to be delivered to the storage node.

13. The NIC of claim 11, wherein the embedded logic is further configured to:
for a Read operation;
receive a second protected data block read from a storage device accessed via the storage node and transferred from the storage node via the network or fabric to a receive port on the NIC, the second protected data block comprising cipher text including encrypted payload data concatenated with an encrypted inner PI and an outer PI generated from the cipher text;
perform one or more PI checks on the cipher text using the outer PI;
strip off the outer PI;
decrypt the cipher text to extract the payload data and the inner PI;
perform one or more PI checks on the payload data using the inner PI; and
forward at least the payload data to the host or write the payload data to a buffer in the host using a Direct Memory Access (DMA) Write.

14. The NIC of claim 10, wherein the embedded logic is further configured to:
for a Read operation;
receive a protected data block read from a storage device accessed via the storage node and transferred from the storage node via the network or fabric to a receive port on the NIC, the protected data block comprising cipher text including encrypted payload data concatenated with third PI;
perform one or more PI checks on the cipher text using the third PI;
decrypt the cipher text to extract the payload data;
generate a fourth PI via processing of the payload data and the third PI;
replace the third PI with the fourth PI to obtain a second data block comprising the data payload concatenated with the fourth PI; and
forward the second data block to the host or write the second data block to a buffer in the host using a Direct Memory Access (DMA) Write.

15. A computing platform, comprising:
a processor, having a plurality of cores;
memory, coupled to the processor;
software, loaded in the memory and executing on one or more of the plurality of cores, comprising a plurality of virtual machines (VMs), each VM running one or more applications;
a Network Interface Controller (NIC), coupled to the processor, including one or more receive ports and one or more transmit ports,
wherein the computing platform is configured to,
in connection with a Non-Volatile Memory Express (NVMe) Write operation associated with a VM,
transfer a data block including logical block (LB) data from a memory buffer in the memory to the NIC;
at the NIC,
generate first protection information (PI) using data in the LB data;
concatenate the LB data with the first PI and encrypt the concatenated LB data and first PI using a key associated with the VM to generate cipher text;
generate a second PI based on the cipher text to generate a protected data block; and
forward the protected data block from a transmit port onto a network or fabric coupled to the network or fabric to be delivered to a storage node coupled to the network or fabric,
wherein the protected data block has a format compliant with an NVMe specification and wherein the first PI is an inner PI and the second PI is an outer PI, and wherein both the inner and outer PI are compliant with the NVMe specification.

16. The computing platform of claim 15, wherein the data block includes logical block data (LB data), further configured to:
in connection with an NVMe Read operation associated with a VM to read data from a storage device integrated in or coupled the storage node,
at the NIC,
receive a protected data block read from a storage device accessed via the storage node and transferred from the storage node via the network or fabric to a receive port on the NIC, the protected data block comprising cipher text including encrypted payload data concatenated with an encrypted inner PI and an outer PI generated from the cipher text;
perform one or more PI checks on the cipher text using the outer PI;
strip off the outer PI;
decrypt, using a key associated with the VM or a Namespace identifier (NSID) associated with the VM, the cipher text to extract the payload data and the inner PI; and
perform one or more PI checks on the payload data using the inner PI; and
write the payload data to a memory buffer in the memory.

17. The computing platform of claim 16, wherein the NIC is configured to write the LB data concatenated with the inner PI as a data block having an extended LBA (Logical Block Address) format to a memory buffer on the host.

18. The computing platform of claim 16, wherein the payload data comprises logical block (LB) data, and wherein the NIC is configured to:
when the one or more PI checks on the payload data pass, strip off the inner PI; and
write the LB data to a memory buffer in the memory using a direct memory access (DMA) Write.

* * * * *

UNITED STATES PATENT AND TRADEMARK OFFICE
CERTIFICATE OF CORRECTION

| | |
|---|---|
| PATENT NO. | : 12,124,619 B2 |
| APPLICATION NO. | : 17/133469 |
| DATED | : October 22, 2024 |
| INVENTOR(S) | : Jose Niell et al. |

It is certified that error appears in the above-identified patent and that said Letters Patent is hereby corrected as shown below:

In the Claims

Column 21, Line 15, Claim 13, should read as follows:
The NIC of claim 10, wherein the embedded logic is further configured to:
    for a Read operation;
    receive a second protected data block read from a storage device accessed via the storage node and transferred from the storage node via the network or fabric to a receive port on the NIC, the second protected data block comprising cipher text including encrypted payload data concatenated with an encrypted inner PI and an outer PI generated from the cipher text;
    perform one or more PI checks on the cipher text using the outer PI;
    strip off the outer PI;
    decrypt the cipher text to extract the payload data and the inner PI;
    perform one or more PI checks on the payload data using the inner PI; and
    forward at least the payload data to the host or write the payload data to a buffer in the host using a Direct Memory Access (DMA) Write.

Signed and Sealed this
Twenty-sixth Day of November, 2024

Katherine Kelly Vidal
*Director of the United States Patent and Trademark Office*